US010027980B2

(12) United States Patent
Kawamura et al.

(10) Patent No.: US 10,027,980 B2
(45) Date of Patent: *Jul. 17, 2018

(54) ADAPTIVELY SUB-SAMPLING LUMA AND CHROMA REFERENCE PIXELS IN INTRA-FRAME PREDICTION FOR VIDEO ENCODING AND DECODING

(71) Applicant: KDDI CORPORATION, Tokyo (JP)

(72) Inventors: Kei Kawamura, Fujimino (JP); Sei Naito, Fujimino (JP)

(73) Assignee: KDDI Corporation, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 14/990,602

(22) Filed: Jan. 7, 2016

(65) Prior Publication Data

US 2016/0119631 A1 Apr. 28, 2016

Related U.S. Application Data

(63) Continuation of application No. PCT/JP2014/068405, filed on Jul. 10, 2014.

(30) Foreign Application Priority Data

Jul. 10, 2013 (JP) ................................ 2013-144726

(51) Int. Cl.
*H04N 19/593* (2014.01)
*H04N 19/119* (2014.01)
(Continued)

(52) U.S. Cl.
CPC ......... *H04N 19/593* (2014.11); *H04N 9/8045* (2013.01); *H04N 19/119* (2014.11);
(Continued)

(58) Field of Classification Search
None
See application file for complete search history.

(56) References Cited

U.S. PATENT DOCUMENTS 9,008,449 B2 4/2015 Ogawa
9,153,040 B2 10/2015 Sato
(Continued)

FOREIGN PATENT DOCUMENTS

CN 102823254 A 12/2012
EP 2 557 793 A1 10/2011
(Continued)

OTHER PUBLICATIONS

International Search Report dated Sep. 16, 2014 for PCT/JP2014/068405 and English translation of the same. (4 pages).
(Continued)

*Primary Examiner* — David N Werner
(74) *Attorney, Agent, or Firm* — Fitch, Even, Tabin & Flannery LLP

(57) ABSTRACT

In the case where an input image is an image of a non-YUV420 format and an encoding unit is the smallest CU block, an adaptive-sub-sampling luma reference pixel acquisition unit sub-samples reference pixels existing neighboring a luma block corresponding to a chroma prediction target block based on a luma intra prediction mode, and acquires a pixel value of each of the sub-sampled reference pixels. In the case where the input image is an image of a non-YUV420 format and the encoding unit is the smallest CU block, an adaptive-sub-sampling chroma reference pixel acquisition unit sub-samples reference pixels existing neighboring the chroma prediction target block based on the luma intra prediction mode, and acquires a pixel value of each of the sub-sampled reference pixels.

15 Claims, 24 Drawing Sheets

(51) Int. Cl.

| | |
|---|---|
| ***H04N 9/804*** | (2006.01) |
| ***H04N 19/132*** | (2014.01) |
| ***H04N 19/186*** | (2014.01) |
| ***H04N 19/59*** | (2014.01) |
| ***H04N 19/176*** | (2014.01) |
| ***H04N 19/159*** | (2014.01) |
| ***H04N 19/196*** | (2014.01) |
| ***H04N 19/182*** | (2014.01) |

(52) U.S. Cl.

CPC ......... *H04N 19/132* (2014.11); *H04N 19/159* (2014.11); *H04N 19/176* (2014.11); *H04N 19/182* (2014.11); *H04N 19/186* (2014.11); *H04N 19/196* (2014.11); *H04N 19/59* (2014.11)

(56) References Cited

U.S. PATENT DOCUMENTS

| | | | | |
|---|---|---|---|---|
| 9,405,989 | B2 | 8/2016 | Ogawa | |
| 9,569,861 | B2 | 2/2017 | Sato | |
| 2014/0003512 | A1* | 1/2014 | Sato ................. | H04N 19/00569 375/240.12 |
| 2016/0065988 | A1* | 3/2016 | Kawamura .......... | H04N 19/593 375/240.12 |
| 2016/0381371 | A1 | 12/2016 | Ogawa | |
| 2017/0078669 | A1 | 3/2017 | Sato | |
| 2017/0078685 | A1 | 3/2017 | Sato | |
| 2017/0359576 | A1* | 12/2017 | Gamei ................... | H04N 19/80 |
| 2018/0041758 | A1* | 2/2018 | Srinivasan ............. | H04N 19/61 |

FOREIGN PATENT DOCUMENTS

| | | | |
|---|---|---|---|
| JP | 2013-34163 | A | 2/2013 |
| WO | 2012/165040 | A1 | 12/2012 |
| WO | 2013/040287 | A1 | 3/2013 |

OTHER PUBLICATIONS

Kawamura et al.: JCTVC-M0412: "AHG5: CU based chroma intra prediction with reduced reference": Apr. 26, 2013: pp. 1-5.

Budagavi et al: JCTVC-G-129: "CE6.a: Sub-sampling portion of neighboring pixlels in calculation of LM parameters": Nov. 6, 2011: pp. 1-3.

Sato: JCTVC-F431r2: "Complexity Reduction of Chroma Intra Prediction by Reconstructed Luma Samples": Jul. 12, 2011: pp. 1-4.

Zhang et al: "New chroma intra prediction modes based on linear model for HEVC": Oct. 3, 2012: pp. 197-200.

Kawamura et al: JCTVC-N0368r1: "Non-RCE1: Chroma Intra prediction with mode-dependent reduced reference": Aug. 2, 2013: pp. 1-5.

Bross et al: JCTVC-L1003_v34: "High Efficiency Video Coding (HEVC) text specification draft 10 (for FDIS & Last Call)".

Kim: JCTVC-M0097: "RCE1: The performance of extended chroma mode for non 4:2:0 format".

Extended European Search Report dated Feb. 10, 2017, issued in corresponding European Patent Application 14823141.8. (9 pages).

Zhang et al.; "CE6.A: New modes (LML and LMA) for chroma intra prediction"; Feb. 2, 2012; XP030051950.

Chinese Office Action dated Feb. 2, 2018 concerning the corresponding Chinese Patent Application No. 201480039166.2.

* cited by examiner (A) CHROMA COMPONENT PIXELS (YUV422)

(B) LUMA COMPONENT PIXELS (YUV422)

(A) CHROMA COMPONENT PIXELS (YUV444)

(B) LUMA COMPONENT PIXELS (YUV444)

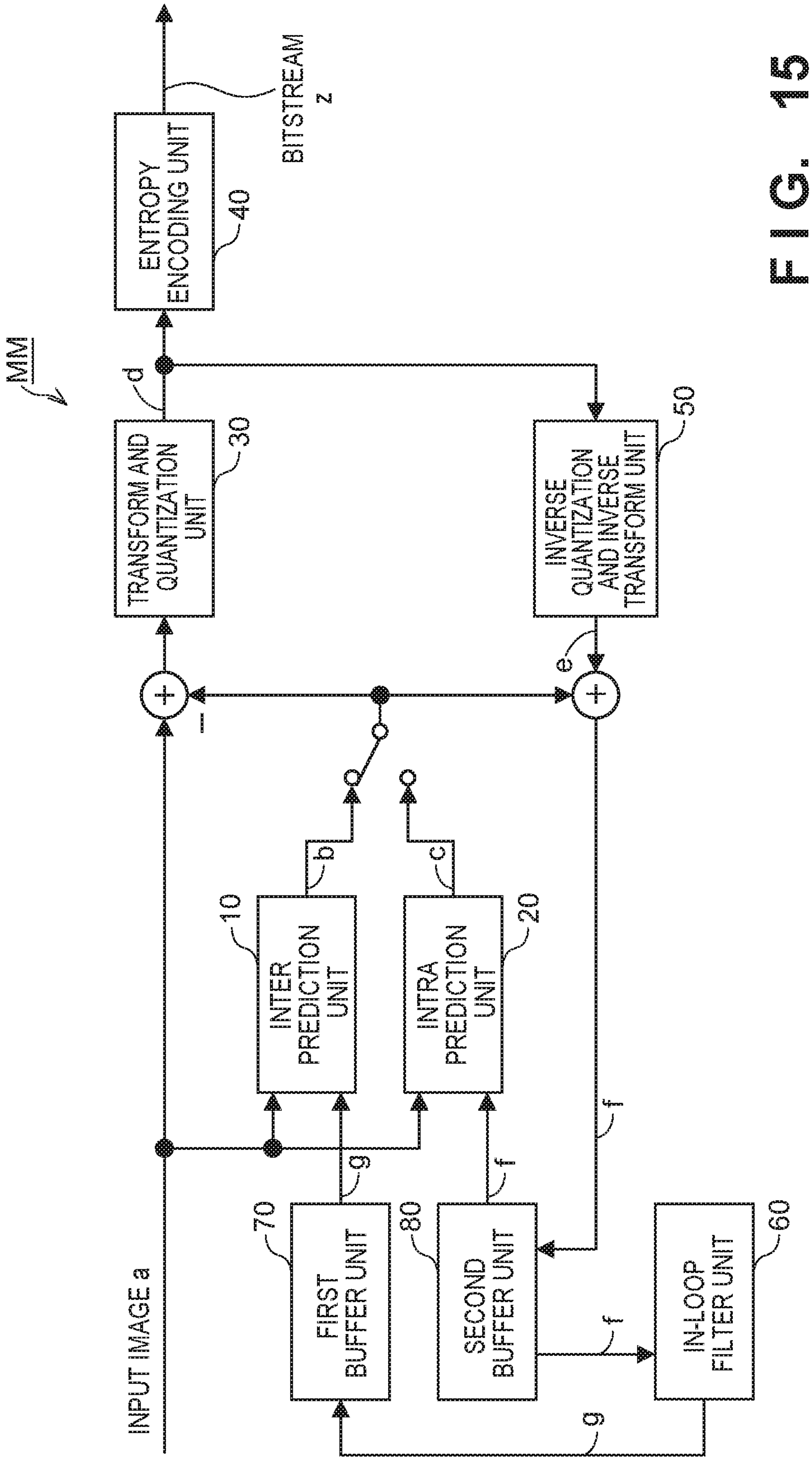
F I G. 15

FIG. 21

Prior Art

| | TU BASE | | | CU BASE | | |
|---|---|---|---|---|---|---|
| COLOR FORMAT | NUMBER OF TIMES OF CALCULATION | NUMBER OF LUMA REFERENCE PIXELS | NUMBER OF CHROMA REFERENCE PIXELS | NUMBER OF TIMES OF CALCULATION | NUMBER OF LUMA REFERENCE PIXELS | NUMBER OF CHROMA REFERENCE PIXELS |
| YUV420 | 8×8=64 | 12 | 8 | 8×8=64 | 12 | 8 |
| YUV422 | 16×8=128 | 16 | 16 | 8×8=64 | 12 | 12 |
| YUV444 | 16×16=256 | 8 | 8 | 8×8=64 | 16 | 16 |

FIG. 24

Prior Art

| | APPLY TECHNIQUE IN NON-PATENT REFERENCE 3 | | | CU BASE | | |
|---|---|---|---|---|---|---|
| COLOR FORMAT | NUMBER OF TIMES OF CALCULATION | NUMBER OF LUMA REFERENCE PIXELS | NUMBER OF CHROMA REFERENCE PIXELS | NUMBER OF TIMES OF CALCULATION | NUMBER OF LUMA REFERENCE PIXELS | NUMBER OF CHROMA REFERENCE PIXELS |
| YUV420 UV420 | 8×8=64 | 12 | 8 | 8×8=64 | 12 | 8 |
| YUV422 UV422 | 8×8=64 | 8 | 8 | 8×8=64 | 12 | 12 |
| YUV444 UV444 | 8×8=64 | 8 | 8 | 8×8=64 | 16 | 16 |

ADAPTIVELY SUB-SAMPLING LUMA AND CHROMA REFERENCE PIXELS IN INTRA-FRAME PREDICTION FOR VIDEO ENCODING AND DECODING

This application is a continuation of International Patent Application No. PCT/JP2014/068405 filed on Jul. 10, 2014, and claims priority to Japanese Patent Application No. 2013-144726 filed on Jul. 10, 2013, the entire content of both of which is incorporated herein by reference.

TECHNICAL FIELD

The present invention relates to video encoding devices, video decoding devices, video systems, video encoding methods, video decoding methods, and computer readable storage media.

BACKGROUND ART

HEVC (High Efficiency Video Coding) has been proposed as a video encoding method using intra prediction, inter prediction, and residual transform (e.g., see Non-patent reference 1).

[Configuration and Operations of Video Encoding Device MM]

FIG. 15 is a block diagram of a video encoding device MM according to a conventional example that codes a video image using the aforementioned video encoding method. The video encoding device MM includes an inter prediction unit 10, an intra prediction unit 20, a transform and quantization unit 30, an entropy encoding unit 40, an inverse quantization and inverse transform unit 50, an in-loop filtering unit 60, a first buffer unit 70, and a second buffer unit 80.

An input image a and a later-described local decoded image g that is supplied from the first buffer unit 70 are input to the inter prediction unit 10. This inter prediction unit 10 performs inter prediction (inter-frame prediction) using the input image a and the local decoded image g to generate and output an inter prediction image b.

The input image a and a later-described local decoded image f that is supplied from the second buffer unit 80 are input to the intra prediction unit 20. This intra prediction unit 20 performs intra prediction (intra-frame prediction) using the input image a and the local decoded image f to generate and output an intra prediction image c.

An error (residual) signal between the input image a and the inter prediction image b or the intra predication image c is input to the transform and quantization unit 30. This transform and quantization unit 30 transforms and quantizes the input residual signal to generate and output a quantization coefficient d.

The quantization coefficient d and side information (not shown) are input to the entropy encoding unit 40. This entropy encoding unit 40 performs entropy encoding on the input signal and outputs the entropy-coded signal as a bitstream z.

The quantization coefficient d is input to the inverse quantization and inverse transform unit 50. This inverse quantization and inverse transform unit 50 performs inverse quantization and inverse transform on the quantization coefficient d to generate and output an inverse-transformed residual signal e.

The second buffer unit 80 accumulates the local decoded image f and supplies the accumulated local decoded image f to the intra prediction unit 20 and the in-loop filtering unit 60 as appropriate. The local decoded image f is a signal obtained by adding up the inter prediction image b or the intra prediction image c and the inverse-transformed residual signal e.

The local decoded image f is input to the in-loop filtering unit 60. This in-loop filtering unit 60 applies a filter such as a deblocking filter to the local decoded image f to generate and output the local decoded image g.

The first buffer unit 70 accumulates the local decoded image g and supplies the accumulated local decoded image g to the inter prediction unit 10 as appropriate.

[Configuration and Operations of Video Decoding Device NN]

FIG. 16 is a block diagram of a video decoding device NN according to a conventional example that decodes a video image from the bitstream z generated by the video encoding device MM. The video decoding device NN includes an entropy decoding unit 110, an inverse transform and inverse quantization unit 120, an inter prediction unit 130, an intra prediction unit 140, an in-loop filter 150, a first buffer unit 160, and a second buffer unit 170.

The bitstream z is input to the entropy decoding unit 110. This entropy decoding unit 110 performs entropy decoding on the bitstream z, and generates and outputs a quantization coefficient B.

The inverse transform and inverse quantization unit 120, the inter prediction unit 130, the intra prediction unit 140, the in-loop filtering unit 150, the first buffer unit 160, and the second buffer unit 170 respectively operate similarly to the inverse quantization and inverse transform unit 50, the inter prediction unit 10, the intra prediction unit 20, the in-loop filtering unit 60, the first buffer unit 70, and the second buffer unit 80 shown in FIG. 15.

(Details of Intra Prediction)

The aforementioned intra prediction will be described below in detail. Regarding intra prediction, Non-patent reference 1 indicates that pixel values in an encoding target block are predicted for each color component, using pixel values of reference pixels, which are reconstructed pixels that have already been encoded. Also, as luma component prediction methods, a total of 35 modes, namely DC, Planar, and direction prediction for 33 directions are indicated as shown in FIG. 17. As chroma component prediction methods, a method using the same prediction classification as that for a luma component, as well as DC, Planar, horizontal, and vertical methods that are independent from those for the luma component are indicated. With the above configuration, spatial redundancy can be reduced for each color component.

Non-patent reference 2 describes an LM mode as a technique for reducing redundancy among color components. For example, a case of using the LM mode for an image of a YUV420 format will now be described using FIG. 18.

FIG. 18A shows chroma component pixels, and FIG. 18B shows luma component pixels. In the LM mode, the chroma component is linearly predicted using the luma component that have been reconstructed in the pixels denoted by 16 white circles in FIG. 18B and a prediction equation indicated as Equation (1) below.

[Equation 1]

$$pred_c[x,y]=\alpha\times((P_L[2x,2y]+P_L[2x,2y+1])>>1)+\beta \qquad (1)$$

In Equation (1), $P_L$ denotes a pixel value of the luma component, and $pred_c$ denotes a predictive pixel value of the chroma component. α and β respectively indicate parameters that can be obtained using reference pixels denoted by 8 black circles in FIG. 18A and 8 black circles in FIG. 18B, and are determined by Equations (2) and (3) below.

[Equation 2]

$$\alpha = \frac{R(\hat{P}_L, P'_C)}{R(\hat{P}_L, \hat{P}_L)} \quad (2)$$

[Equation 3]

$$\beta = M(P'_C) - \alpha \times M(\hat{P}_L) \quad (3)$$

R in Equation (2) denotes inner product calculation, M in Equation (3) denotes averaging calculation, and $P'_c$ in Equations (2) and (3) denotes a pixel value of a reference pixel of the chroma component. $P\hat{}_L$ denotes a pixel value of the luma component obtained while considering phases of the luma and the chroma, and is determined by Equation (4) below.

[Equation 4]

$$\hat{P}_L[x,y]=(P_L[2x,2y]+P_L[2x,2y+1])>>1 \quad (4)$$

Note that the phase of the reference pixel in the upper part remains shifted in order to reduce memory access. The chroma prediction is performed for each smallest processing block, which is called a TU (Transform Unit).

In the case of extending the LM mode for an image of the aforementioned YUV420 format and using the extended LM mode for an image of a YUV422 format, the number of reference pixels in the vertical direction increases as shown in FIG. 19.

FIG. 20 is a block diagram of the intra prediction units 20 and 140 that perform intra prediction using the aforementioned LM mode. The intra prediction units 20 and 140 each include a luma reference pixel acquisition unit 21, a chroma reference pixel acquisition unit 22, a prediction coefficient derivation unit 23, and a chroma linear prediction unit 24.

The luma component of the local decoded image f is input to the luma reference pixel acquisition unit 21. This luma reference pixel acquisition unit 21 acquires a pixel value of each reference pixel existing neighboring a luma block corresponding to a chroma prediction target block, adjusts the phase of the acquired pixel value, and outputs the phase-adjusted pixel value as a luma reference pixel value h.

The chroma component of the local decoded image f is input to the chroma reference pixel acquisition unit 22. This chroma reference pixel acquisition unit 22 acquires a pixel value of each reference pixel existing neighboring the chroma prediction target block, and outputs the acquired pixel value as a chroma reference pixel value i.

The luma reference pixel value h and the chroma reference pixel value i are input to the prediction coefficient derivation unit 23. This prediction coefficient derivation unit 23 obtains the parameters α and β from Equations (2) to (4) above using these input pixel values, and outputs the parameters α and β as prediction coefficients j.

The luma component of the local decoded image f and the prediction coefficients j are input to the chroma linear prediction unit 24. This chroma linear prediction unit 24 obtains a predictive pixel value of the chroma component by Equation (1) above using these input signals, and outputs the obtained predictive pixel value as a chroma predictive pixel value k.

Incidentally, the available memory capacity is increasing with the advance of the semiconductor technology. However, with the increase of the memory capacity, the granularity of memory access becomes large. Meanwhile, the memory bandwidth has not been significantly widened compared with the increase of the memory capacity. Since the memory is used in encoding and decoding of video images, the granularity of the memory access and the memory bandwidth have been bottlenecks.

In addition, manufacturing costs and power consumption of a memory that is closest to a calculation core (e.g., an SRAM) are higher than those of an external memory (e.g., a DRAM). For this reason, it is favorable that the memory capacity of the memory closest to the calculation core can be reduced as much as possible. However, since video images need to be able to be decoded even with the worst value provided in the specifications, the memory closest to the calculation core needs to be able to satisfy memory requirements at the worst value, rather than average memory requirements (granularity, size, and number etc.).

In the LM mode, since the parameters are derived for each TU as mentioned above, the number of reference pixels increases, and the number of times of calculation and the number of times of memory access become large.

For example, the number of times of calculation and the number of reference pixels for deriving the parameters in the case of using the LM mode for an image of the YUV420 format will be considered below. The size of an LCU (Largest Encoding unit), which is the largest processing block, is provided as 64×64 in the main profile in Non-patent reference 1, and the size of the smallest CU, which is the smallest processing block, is 4×4. In addition, since the number of chroma pixels in the YUV420 format is ¼, the smallest calculation block of the luma component is 8×8. For this reason, the number of times of calculation for deriving the parameters is $(64/8)^2=64$ times, and the number of reference pixels is 28×64.

Non-patent reference 2 describes a technique for deriving the parameters for each CU (Encoding unit) in order to reduce the worst value of the number of times of calculation for deriving the parameters for an image of a non-YUV420 format. FIG. 21 shows the number of times of calculation and the number of reference pixels in the case of deriving the parameters for each TU and in the case of deriving the parameters for each CU.

As described above, redundancy among color components can be reduced in the LM mode. However, when considering the CTU units, a problem arises in that the number of reference pixels of the worst value used when deriving the parameters is large.

Non-patent reference 3 describes a technique for reducing the number of reference pixels in the LM mode for an image of a non-YUV420 format.

For example, a case of applying the technique in Non-patent reference 3 to an image of a YUV422 format will be described using FIG. 22. In this case, the number of reference pixels neighboring the long side of a prediction target block is half compared with the case shown in FIG. 19. For this reason, as shown in FIG. 24, both the number of luma reference pixels and the number of chroma reference pixels are 8 pixels.

Also, a case of applying the technique in Non-patent reference 3 to an image of a YUV444 format will be described using FIG. 23. In this case as well, the number of reference pixels neighboring the long side of a prediction target block is half. For this reason, as shown in FIG. 24, both the number of luma reference pixels and the number of chroma reference pixels are 8 pixels.

PRIOR ART DOCUMENT(S)

Non-Patent Reference

Non-patent reference 1: JCTVC-L1003, High Efficiency Video Coding (HEVC) Range Extensions text specification: Draft 2 (for PDAM).
Non-patent reference 2: JCTVC-M0097, RCE1: The performance of extended chroma mode for non-4:2:0 format.
Non-patent reference 3: JCTVC-M0412, AHG5: CU based chroma intra prediction with reduced reference.

DISCLOSURE OF INVENTION

Problems that the Invention is to Solve

The technique described in Non-patent reference 3 achieves a reduction in the number of reference pixels by uniformly sub-sampling the reference pixels. For this reason, when sub-sampling the reference pixels, characteristics of images are not considered, and there is a possibility of degradation in encoding performance.

The present invention has been made in view of the foregoing problem, and an object of the invention is to reduce the number of reference pixels to be referenced in order to reduce redundancy among color components, while suppressing degradation in encoding performance.

Means of Solving the Problems

In order to solve the foregoing problem, the present invention proposes the following items.

(1) The invention proposes a video encoding device (corresponding, for example, to a video encoding device AA in FIG. 1) that codes a video image configured to include a plurality of color components, including: an intra-frame prediction unit (corresponding, for example, to an intra prediction unit 20A in FIG. 1) for performing intra-frame prediction, the intra-frame prediction unit including: an adaptive-sub-sampling luma reference pixel sub-sampling unit (corresponding, for example, to an adaptive-sub-sampling luma reference pixel acquisition unit 21A in FIG. 2) for sub-sampling reference pixels existing neighboring a luma block corresponding to a chroma prediction target block based on a luma intra prediction mode; an adaptive-sub-sampling luma reference pixel acquisition unit (corresponding, for example, to the adaptive-sub-sampling luma reference pixel acquisition unit 21A in FIG. 2) for acquiring a pixel value of a reference pixel after the sub-sampling performed by the adaptive-sub-sampling luma reference pixel sub-sampling unit; an adaptive-sub-sampling chroma reference pixel sub-sampling unit (corresponding, for example, to an adaptive-sub-sampling chroma reference pixel acquisition unit 22A in FIG. 2) for sub-sampling reference pixels existing neighboring the chroma prediction target block based on the luma intra prediction mode; an adaptive-sub-sampling chroma reference pixel acquisition unit (corresponding, for example, to the adaptive-sub-sampling chroma reference pixel acquisition unit 22A in FIG. 2) for acquiring a pixel value of a reference pixel after the sub-sampling performed by the adaptive-sub-sampling chroma reference pixel sub-sampling unit; a prediction coefficient derivation unit (corresponding, for example, to a prediction coefficient derivation unit 23 in FIG. 2) for deriving a prediction coefficient using the pixel value acquired by the adaptive-sub-sampling luma reference pixel acquisition unit and the pixel value acquired by the adaptive-sub-sampling chroma reference pixel acquisition unit; and a chroma linear prediction unit (corresponding, for example, to a chroma linear prediction unit 24 in FIG. 2) for linearly predicting a predictive pixel value of each pixel constituting the chroma prediction target block, using a local decoded pixel value of the luma block corresponding to the chroma prediction target block and the prediction coefficient derived by the prediction coefficient derivation unit.

According to this invention, in the intra-frame prediction, the reference pixels existing neighboring the luma block corresponding to the chroma prediction target block and the reference pixels existing neighboring the chroma prediction target block are sub-sampled based on the luma intra prediction mode. For this reason, the reference pixels can be sub-sampled based on a luma component prediction method, and therefore the number of pixels to be referenced in order to reduce redundancy among color components can be halved, while considering characteristics of the image. Accordingly, the number of reference pixels to be referenced in order to reduce redundancy among color components can be reduced, while suppressing degradation in encoding performance.

(2) Regarding the video encoding device in (1), the present invention proposes a video encoding device in which the adaptive-sub-sampling luma reference pixel sub-sampling unit and the adaptive-sub-sampling chroma reference pixel sub-sampling unit perform the sub-sampling only in a case where a encoding unit is a predetermined smallest encoding unit.

According to this invention, in the video encoding device in (1), the aforementioned sub-sampling is performed only in the case where the encoding unit is the predetermined smallest encoding unit. For this reason, the number of reference pixels to be referenced in order to reduce redundancy among color components can be reduced only in the case where the encoding unit is the predetermined smallest encoding unit.

(3) Regarding the video encoding device in (1), the present invention proposes a video encoding device in which the adaptive-sub-sampling luma reference pixel sub-sampling unit and the adaptive-sub-sampling chroma reference pixel sub-sampling unit always perform the sub-sampling regardless of a encoding unit.

According to this invention, in the video encoding device in (1), the aforementioned sub-sampling is always performed regardless of the encoding unit. For this reason, the number of reference pixels to be referenced in order to reduce redundancy among color components can always be reduced regardless of the encoding unit.

(4) Regarding any of the video encoding devices in (1) to (3), the present invention proposes a video encoding device in which the adaptive-sub-sampling luma reference pixel sub-sampling unit and the adaptive-sub-sampling chroma reference pixel sub-sampling unit perform the sub-sampling and reduce the number of reference pixels to 1/n (where n is any power of two that satisfies $n>0$) of the number of reference pixels before the sub-sampling.

According to this invention, in any of the video encoding devices in (1) to (3), by sub-sampling the reference pixels, the number of reference pixels is reduced to 1/n of the number of reference pixels before the sub-sampling. For this reason, it is possible to adjust suppressing degradation in encoding performance and a decrease of the number of reference pixels to be referenced in order to reduce redundancy among color components, by setting the value of n.

(5) Regarding any of the video encoding devices in (1) to (4), the present invention proposes a video encoding device in which the video image is a video image of a YUV422 format.

According to this invention, in any of the video encoding devices in (1) to (4), the video image is a video image of a YUV422 format. For this reason, even if a pixel block of the chroma component is rectangular in the video image of a YUV422 format, the reference pixels can be sub-sampled such that the number thereof becomes a power of two, and therefore, operations such as division can be achieved with shift operation.

(6) Regarding any of the video encoding devices in (1) to (5), the present invention proposes a video encoding device in which the size of a processing block is 8×8.

Here, in the case where the size of the processing block is 4×4, the reference pixels are excessively sub-sampled, and accordingly the accuracy of the prediction coefficient decreases, and the number of times of operation in a CTU (64×64) is 16×16=256, which is too many. In contrast, in the case where the size of the processing block is 16×16, the reference pixels are not excessively sub-sampled, and therefore the accuracy of the prediction coefficient increases, whereas the encoding performance degrades since detailed characteristics of the processing block cannot be reflected.

For this reason, according to this invention, in any of the video encoding devices in (1) to (5), the size of the processing block is 8×8. For this reason, the accuracy of the prediction coefficient can be increased while not excessively sub-sampling the reference pixels, and it is also possible to reflect detailed characteristics of the processing block while suppressing the number of times of operation in each CTU, and increase the encoding performance.

(7) The invention proposes A video decoding device (corresponding, for example, to a video decoding device BB in FIG. 9) that decodes a video image configured to include a plurality of color components, including: an intra-frame prediction unit (corresponding, for example, to an intra prediction unit 140A in FIG. 9) for performing intra-frame prediction, the intra-frame prediction unit including: an adaptive-sub-sampling luma reference pixel sub-sampling unit (corresponding, for example, to the adaptive-sub-sampling luma reference pixel acquisition unit 21A in FIG. 2) for sub-sampling reference pixels existing neighboring a luma block corresponding to a chroma prediction target block based on a luma intra prediction mode; an adaptive-sub-sampling luma reference pixel acquisition unit (corresponding, for example, to the adaptive-sub-sampling luma reference pixel acquisition unit 21A in FIG. 2) for acquiring a pixel value of a reference pixel after the sub-sampling performed by the adaptive-sub-sampling luma reference pixel sub-sampling unit; an adaptive-sub-sampling chroma reference pixel sub-sampling unit (corresponding, for example, to the adaptive-sub-sampling chroma reference pixel acquisition unit 22A in FIG. 2) for sub-sampling reference pixels existing neighboring the chroma prediction target block based on the luma intra prediction mode; an adaptive-sub-sampling chroma reference pixel acquisition unit (corresponding, for example, to the adaptive-sub-sampling chroma reference pixel acquisition unit 22A in FIG. 2) for acquiring a pixel value of a reference pixel after the sub-sampling performed by the adaptive-sub-sampling chroma reference pixel sub-sampling unit; a prediction coefficient derivation unit (corresponding, for example, to the prediction coefficient derivation unit 23 in FIG. 2) for deriving a prediction coefficient using the pixel value acquired by the adaptive-sub-sampling luma reference pixel acquisition unit and the pixel value acquired by the adaptive-sub-sampling chroma reference pixel acquisition unit; and a chroma linear prediction unit (corresponding, for example, to the chroma linear prediction unit 24 in FIG. 2) for linearly predicting a predictive pixel value of each pixel constituting the chroma prediction target block, using a local decoded pixel value of the luma block corresponding to the chroma prediction target block and the prediction coefficient derived by the prediction coefficient derivation unit.

According to this invention, in the intra-frame prediction, the reference pixels existing neighboring the luma block corresponding to the chroma prediction target block and the reference pixels existing neighboring the chroma prediction target block are sub-sampled based on the luma intra prediction mode. For this reason, the reference pixels can be sub-sampled based on a luma component prediction method, and therefore the number of pixels to be referenced in order to reduce redundancy among color components can be halved, while considering characteristics of the image. Accordingly, the number of reference pixels to be referenced in order to reduce redundancy among color components can be reduced, while suppressing degradation in encoding performance.

(8) Regarding the video decoding device in (7), the present invention proposes a video decoding device in which the adaptive-sub-sampling luma reference pixel sub-sampling unit and the adaptive-sub-sampling chroma reference pixel sub-sampling unit perform the sub-sampling only in a case where a decoding unit is a predetermined smallest decoding unit.

According to this invention, in the video decoding device in (7), the aforementioned sub-sampling is performed only in the case where the decoding unit is the predetermined smallest decoding unit. For this reason, the number of reference pixels to be referenced in order to reduce redundancy among color components can be reduced only in the case where the decoding unit is the predetermined smallest decoding unit.

(9) Regarding the video decoding device in (7), the present invention proposes a video decoding device in which the adaptive-sub-sampling luma reference pixel sub-sampling unit and the adaptive-sub-sampling chroma reference pixel sub-sampling unit always perform the sub-sampling regardless of a decoding unit.

According to this invention, in the video decoding device in (7), the aforementioned sub-sampling is always performed regardless of the decoding unit. For this reason, the number of reference pixels to be referenced in order to reduce redundancy among color components can always be reduced regardless of the decoding unit.

(10) Regarding any of the video decoding devices in (7) to (9), the present invention proposes a video decoding device in which the adaptive-sub-sampling luma reference pixel sub-sampling unit and the adaptive-sub-sampling chroma reference pixel sub-sampling unit perform the sub-sampling and reduce the number of reference pixels to 1/n (where n is any power of two that satisfies n>0) of the number of reference pixels before the sub-sampling.

According to this invention, in any of the video decoding devices in (7) to (9), by sub-sampling the reference pixels, the number of reference pixels is reduced to 1/n of the number of reference pixels before the sub-sampling. For this reason, it is possible to adjust suppressing degradation in encoding performance and a decrease of the number of reference pixels to be referenced in order to reduce redundancy among color components, by setting the value of n.

(11) Regarding any of the video decoding devices in (7) to (10), the present invention proposes a video decoding device in which the video image is a video image of a YUV422 format.

According to this invention, in any of the video decoding devices in (7) to (10), the video image is a video image of a YUV422 format. For this reason, even if a pixel block of the chroma component is rectangular in the video image of a YUV422 format, the number of reference pixels can be sub-sampled so as to become a power of two, and therefore, operations such as division can be achieved with shift operation.

(12) Regarding any of the video decoding devices in (7) to (11), the present invention proposes a video decoding device in which the size of a processing block is 8×8.

Here, in the case where the size of the processing block is 4×4, the reference pixels are excessively sub-sampled, and accordingly the accuracy of the prediction coefficient decreases, and the number of times of operation in a CTU (64×64) is 16×16=256, which is too many. In contrast, in the case where the size of the processing block is 16×16, the reference pixels are not excessively sub-sampled, and therefore the accuracy of the prediction coefficient increases, whereas the encoding performance degrades since detailed characteristics of the processing block cannot be reflected.

For this reason, according to this invention, in any of the video encoding devices in (7) to (11), the size of the processing block is 8×8. For this reason, the accuracy of the prediction coefficient can be increased while not excessively sub-sampling the reference pixels, and it is also possible to reflect detailed characteristics of the processing block while suppressing the number of times of operation in each CTU, and increase the encoding performance.

(13) The present invention proposes a video system including a video encoding device (corresponding, for example, to the video encoding device AA in FIG. 1) that codes a video image configured to include a plurality of color components, and a video decoding device (corresponding, for example, to the video decoding device BB in FIG. 9) that decodes a video image configured to include a plurality of color components, the video encoding device including an encoding-side intra-frame prediction unit (corresponding, for example, to the intra prediction unit 20A in FIG. 1) for performing intra-frame prediction, the encoding-side intra-frame prediction unit including: a coding-side adaptive-sub-sampling luma reference pixel sub-sampling unit (corresponding, for example, to the adaptive-sub-sampling luma reference pixel acquisition unit 21A in FIG. 2) for sub-sampling reference pixels existing neighboring a luma block corresponding to a chroma prediction target block based on a luma intra prediction mode; a coding-side adaptive-sub-sampling luma reference pixel acquisition unit (corresponding, for example, to the adaptive-sub-sampling luma reference pixel acquisition unit 21A in FIG. 2) for acquiring a pixel value of a reference pixel after the sub-sampling performed by the encoding-side adaptive-sub-sampling luma reference pixel sub-sampling unit; a coding-side adaptive-sub-sampling chroma reference pixel sub-sampling unit (corresponding, for example, to the adaptive-sub-sampling chroma reference pixel acquisition unit 22A in FIG. 2) for sub-sampling reference pixels existing neighboring the chroma prediction target block based on the luma intra prediction mode; a coding-side adaptive-sub-sampling chroma reference pixel acquisition unit (corresponding, for example, to the adaptive-sub-sampling chroma reference pixel acquisition unit 22A in FIG. 2) for acquiring a pixel value of a reference pixel after the sub-sampling performed by the encoding-side adaptive-sub-sampling chroma reference pixel sub-sampling unit; a coding-side prediction coefficient derivation unit (corresponding, for example, to the prediction coefficient derivation unit 23 in FIG. 2) for deriving a prediction coefficient using the pixel value acquired by the encoding-side adaptive-sub-sampling luma reference pixel acquisition unit and the pixel value acquired by the encoding-side adaptive-sub-sampling chroma reference pixel acquisition unit; and a coding-side chroma linear prediction unit (corresponding, for example, to the chroma linear prediction unit 24 in FIG. 2) for linearly predicting a predictive pixel value of each pixel constituting the chroma prediction target block, using a local decoded pixel value of the luma block corresponding to the chroma prediction target block, and the prediction coefficient derived by the encoding-side prediction coefficient derivation unit, the video decoding device including a decoding-side intra-frame prediction unit (corresponding, for example, to the intra prediction unit 140A in FIG. 9) for performing intra-frame prediction, the decoding-side intra-frame prediction unit including: a decoding-side adaptive-sub-sampling luma reference pixel sub-sampling unit (corresponding, for example, to the adaptive-sub-sampling luma reference pixel acquisition unit 21A in FIG. 2) for sub-sampling reference pixels existing neighboring a luma block corresponding to a chroma prediction target block based on the luma intra prediction mode; a decoding-side adaptive-sub-sampling luma reference pixel acquisition unit (corresponding, for example, to the adaptive-sub-sampling luma reference pixel acquisition unit 21A in FIG. 2) for acquiring a pixel value of a reference pixel after the sub-sampling performed by the decoding-side adaptive-sub-sampling luma reference pixel sub-sampling unit; decoding-side adaptive-sub-sampling chroma reference pixel sub-sampling unit (corresponding, for example, to the adaptive-sub-sampling chroma reference pixel acquisition unit 22A in FIG. 2) for sub-sampling reference pixels existing neighboring the chroma prediction target block based on the luma intra prediction mode; a decoding-side adaptive-sub-sampling chroma reference pixel acquisition unit (corresponding, for example, to the adaptive-sub-sampling chroma reference pixel acquisition unit 22A in FIG. 2) for acquiring a pixel value of a reference pixel after the sub-sampling performed by the decoding-side adaptive-sub-sampling chroma reference pixel sub-sampling unit; a decoding-side prediction coefficient derivation unit (corresponding, for example, to the prediction coefficient derivation unit 23 in FIG. 2) for deriving a prediction coefficient using the pixel value acquired by the decoding-side adaptive-sub-sampling luma reference pixel acquisition unit and the pixel value acquired by the decoding-side adaptive-sub-sampling chroma reference pixel acquisition unit; and a decoding-side chroma linear prediction unit (corresponding, for example, to the chroma linear prediction unit 24 in FIG. 2) for linearly predicting a predictive pixel value of each pixel constituting the chroma prediction target block, using a local decoded pixel value of the luma block corresponding to the chroma prediction target block and the prediction coefficient derived by the decoding-side prediction coefficient derivation unit.

According to this invention, in the intra-frame prediction, the reference pixels existing neighboring the luma block corresponding to the chroma prediction target block and the reference pixels existing neighboring the chroma prediction target block are sub-sampled based on the luma intra prediction mode. For this reason, the reference pixels can be sub-sampled based on a luma component prediction method, and therefore the number of pixels to be referenced in order to reduce redundancy among color components can be halved, while considering characteristics of the image. Accordingly, the number of reference pixels to be referenced in order to reduce redundancy among color components can be reduced, while suppressing degradation in encoding performance.

(14) The invention proposes a method for encoding a video image in a video encoding device (corresponding, for example, to the video encoding device AA in FIG. 1) that codes a video image configured to include a plurality of color components, the video encoding device including an intra-frame prediction unit (corresponding, for example, to the intra prediction unit 20A in FIG. 1) for performing intra-frame prediction and having: an adaptive-sub-sampling luma reference pixel sub-sampling unit (corresponding, for example, to the adaptive-sub-sampling luma reference pixel acquisition unit 21A in FIG. 2); an adaptive-sub-sampling luma reference pixel acquisition unit (corresponding, for example, to the adaptive-sub-sampling luma reference pixel acquisition unit 21A in FIG. 2); an adaptive-sub-sampling chroma reference pixel sub-sampling unit (corresponding, for example, to the adaptive-sub-sampling chroma reference pixel acquisition unit 22A in FIG. 2); an adaptive-sub-sampling chroma reference pixel acquisition unit (corresponding, for example, to the adaptive-sub-sampling chroma reference pixel acquisition unit 22A in FIG. 2); a prediction coefficient derivation unit (corresponding, for example, to the prediction coefficient derivation unit 23 in FIG. 2); and a chroma linear prediction unit (corresponding, for example, to the chroma linear prediction unit 24 in FIG. 2), the method including: a first step in which the adaptive-sub-sampling luma reference pixel sub-sampling unit sub-samples reference pixels existing neighboring a luma block corresponding to a chroma prediction target block based on a luma intra prediction mode; a second step in which the adaptive-sub-sampling luma reference pixel acquisition unit acquires a pixel value of a reference pixel after the sub-sampling performed by the adaptive-sub-sampling luma reference pixel sub-sampling unit; a third step in which the adaptive-sub-sampling chroma reference pixel sub-sampling unit sub-samples reference pixels existing neighboring the chroma prediction target block based on the luma intra prediction mode; a fourth step in which the adaptive-sub-sampling chroma reference pixel acquisition unit acquires a pixel value of a reference pixel after the sub-sampling performed by the adaptive-sub-sampling chroma reference pixel sub-sampling unit; a fifth step in which the prediction coefficient derivation unit derives a prediction coefficient using the pixel value acquired by the adaptive-sub-sampling luma reference pixel acquisition unit and the pixel value acquired by the adaptive-sub-sampling chroma reference pixel acquisition unit; and a sixth step in which the chroma linear prediction unit linearly predicts a predictive pixel value of each pixel constituting the chroma prediction target block, using a local decoded pixel value of the luma block corresponding to the chroma prediction target block and the prediction coefficient derived by the prediction coefficient derivation unit.

According to this invention, in the intra-frame prediction, the reference pixels existing neighboring the luma block corresponding to the chroma prediction target block and the reference pixels existing neighboring the chroma prediction target block are sub-sampled based on the luma intra prediction mode. For this reason, the reference pixels can be sub-sampled based on a luma component prediction method, and therefore the number of pixels to be referenced in order to reduce redundancy among color components can be halved, while considering characteristics of the image. Accordingly, the number of reference pixels to be referenced in order to reduce redundancy among color components can be reduced, while suppressing degradation in encoding performance.

(15) The invention proposes a method for decoding a video image in a video decoding device (corresponding, for example, to the video decoding device BB in FIG. 9) that decodes a video image configured to include a plurality of color components, the video decoding device including an intra-frame prediction unit (corresponding, for example, to the intra prediction unit 140A in FIG. 9) for performing intra-frame prediction and having: an adaptive-sub-sampling luma reference pixel sub-sampling unit (corresponding, for example, to the adaptive-sub-sampling luma reference pixel acquisition unit 21A in FIG. 2); an adaptive-sub-sampling luma reference pixel acquisition unit (corresponding, for example, to the adaptive-sub-sampling luma reference pixel acquisition unit 21A in FIG. 2); an adaptive-sub-sampling chroma reference pixel sub-sampling unit (corresponding, for example, to the adaptive-sub-sampling chroma reference pixel acquisition unit 22A in FIG. 2); an adaptive-sub-sampling chroma reference pixel acquisition unit (corresponding, for example, to the adaptive-sub-sampling chroma reference pixel acquisition unit 22A in FIG. 2); a prediction coefficient derivation unit (corresponding, for example, to the prediction coefficient derivation unit 23 in FIG. 2); and a chroma linear prediction unit (corresponding, for example, to the chroma linear prediction unit 24 in FIG. 2), the method including: a first step in which the adaptive-sub-sampling luma reference pixel sub-sampling unit sub-samples reference pixels existing neighboring a luma block corresponding to a chroma prediction target block based on a luma intra prediction mode; a second step in which the adaptive-sub-sampling luma reference pixel acquisition unit acquires a pixel value of a reference pixel after the sub-sampling performed by the adaptive-sub-sampling luma reference pixel sub-sampling unit; a third step in which the adaptive-sub-sampling chroma reference pixel sub-sampling unit sub-samples reference pixels existing neighboring the chroma prediction target block based on the luma intra prediction mode; a fourth step in which the adaptive-sub-sampling chroma reference pixel acquisition unit acquires a pixel value of a reference pixel after the sub-sampling performed by the adaptive-sub-sampling chroma reference pixel sub-sampling unit; a fifth step in which the prediction coefficient derivation unit derives a prediction coefficient using the pixel value acquired by the adaptive-sub-sampling luma reference pixel acquisition unit and the pixel value acquired by the adaptive-sub-sampling chroma reference pixel acquisition unit; and a sixth step in which the chroma linear prediction unit linearly predicts a predictive pixel value of each pixel constituting the chroma prediction target block, using a local decoded pixel value of the luma block corresponding to the chroma prediction target block and the prediction coefficient derived by the prediction coefficient derivation unit.

According to this invention, in the intra-frame prediction, the reference pixels existing neighboring the luma block corresponding to the chroma prediction target block and the reference pixels existing neighboring the chroma prediction target block are sub-sampled based on the luma intra prediction mode. For this reason, the reference pixels can be sub-sampled based on a luma component prediction method, and therefore the number of pixels to be referenced in order to reduce redundancy among color components can be halved, while considering characteristics of the image. Accordingly, the number of reference pixels to be referenced in order to reduce redundancy among color components can be reduced, while suppressing degradation in encoding performance.

(16) The present invention proposes a non-transitory computer readable storage medium storing a program for causing a computer to execute a method for encoding a video image in a video encoding device (corresponding, for example, to the video encoding device AA in FIG. 1) that codes a video image configured to include a plurality of color components, the video encoding device including an intra-frame prediction unit (corresponding, for example, to the intra prediction unit 20A in FIG. 1) for performing intra-frame prediction and having: an adaptive-sub-sampling luma reference pixel sub-sampling unit (corresponding, for example, to the adaptive-sub-sampling luma reference pixel acquisition unit 21A in FIG. 2); an adaptive-sub-sampling luma reference pixel acquisition unit (corresponding, for example, to the adaptive-sub-sampling luma reference pixel acquisition unit 21A in FIG. 2); an adaptive-sub-sampling chroma reference pixel sub-sampling unit (corresponding, for example, to the adaptive-sub-sampling chroma reference pixel acquisition unit 22A in FIG. 2); an adaptive-sub-sampling chroma reference pixel acquisition unit (corresponding, for example, to the adaptive-sub-sampling chroma reference pixel acquisition unit 22A in FIG. 2); a prediction coefficient derivation unit (corresponding, for example, to the prediction coefficient derivation unit 23 in FIG. 2); and a chroma linear prediction unit (corresponding, for example, to the chroma linear prediction unit 24 in FIG. 2), the method including: a first step in which the adaptive-sub-sampling luma reference pixel sub-sampling unit sub-samples reference pixels existing neighboring a luma block corresponding to a chroma prediction target block based on a luma intra prediction mode; a second step in which the adaptive-sub-sampling luma reference pixel acquisition unit acquires a pixel value of a reference pixel after the sub-sampling performed by the adaptive-sub-sampling luma reference pixel sub-sampling unit; a third step in which the adaptive-sub-sampling chroma reference pixel sub-sampling unit sub-samples reference pixels existing neighboring the chroma prediction target block based on the luma intra prediction mode; a fourth step in which the adaptive-sub-sampling chroma reference pixel acquisition unit acquires a pixel value of a reference pixel after the sub-sampling performed by the adaptive-sub-sampling chroma reference pixel sub-sampling unit; a fifth step in which the prediction coefficient derivation unit derives a prediction coefficient using the pixel value acquired by the adaptive-sub-sampling luma reference pixel acquisition unit and the pixel value acquired by the adaptive-sub-sampling chroma reference pixel acquisition unit; and a sixth step in which the chroma linear prediction unit linearly predicts a predictive pixel value of each pixel constituting the chroma prediction target block, using a local decoded pixel value of the luma block corresponding to the chroma prediction target block and the prediction coefficient derived by the prediction coefficient derivation unit.

According to this invention, in the intra-frame prediction, the reference pixels existing neighboring the luma block corresponding to the chroma prediction target block and the reference pixels existing neighboring the chroma prediction target block are sub-sampled based on the luma intra prediction mode. For this reason, the reference pixels can be sub-sampled based on a luma component prediction method, and therefore the number of pixels to be referenced in order to reduce redundancy among color components can be halved, while considering characteristics of the image. Accordingly, the number of reference pixels to be referenced in order to reduce redundancy among color components can be reduced, while suppressing degradation in encoding performance.

(17) The present invention proposes a non-transitory computer readable storage medium storing a program for causing a computer to execute a method for decoding a video image in a video decoding device (corresponding, for example, to the video decoding device BB in FIG. 9) that decodes a video image configured to include a plurality of color components, the video decoding device including an intra-frame prediction unit (corresponding, for example, to the intra prediction unit 140A in FIG. 9) for performing intra-frame prediction and having: an adaptive-sub-sampling luma reference pixel sub-sampling unit (corresponding, for example, to the adaptive-sub-sampling luma reference pixel acquisition unit 21A in FIG. 2); an adaptive-sub-sampling luma reference pixel acquisition unit (corresponding, for example, to the adaptive-sub-sampling luma reference pixel acquisition unit 21A in FIG. 2); an adaptive-sub-sampling chroma reference pixel sub-sampling unit (corresponding, for example, to the adaptive-sub-sampling chroma reference pixel acquisition unit 22A in FIG. 2); an adaptive-sub-sampling chroma reference pixel acquisition unit (corresponding, for example, to the adaptive-sub-sampling chroma reference pixel acquisition unit 22A in FIG. 2); a prediction coefficient derivation unit (corresponding, for example, to the prediction coefficient derivation unit 23 in FIG. 2); and a chroma linear prediction unit (corresponding, for example, to the chroma linear prediction unit 24 in FIG. 2), the method including: a first step in which the adaptive-sub-sampling luma reference pixel sub-sampling unit sub-samples reference pixels existing neighboring a luma block corresponding to a chroma prediction target block based on a luma intra prediction mode; a second step in which the adaptive-sub-sampling luma reference pixel acquisition unit acquires a pixel value of a reference pixel after the sub-sampling performed by the adaptive-sub-sampling luma reference pixel sub-sampling unit; a third step in which the adaptive-sub-sampling chroma reference pixel sub-sampling unit sub-samples reference pixels existing neighboring the chroma prediction target block based on the luma intra prediction mode; a fourth step in which the adaptive-sub-sampling chroma reference pixel acquisition unit acquires a pixel value of a reference pixel after the sub-sampling performed by the adaptive-sub-sampling chroma reference pixel sub-sampling unit; a fifth step in which the prediction coefficient derivation unit derives a prediction coefficient using the pixel value acquired by the adaptive-sub-sampling luma reference pixel acquisition unit and the pixel value acquired by the adaptive-sub-sampling chroma reference pixel acquisition unit; and a sixth step in which the chroma linear prediction unit linearly predicts a predictive pixel value of each pixel constituting the chroma prediction target block, using a local decoded pixel value of the luma block corresponding to the chroma prediction target block and the prediction coefficient derived by the prediction coefficient derivation unit.

According to this invention, in the intra-frame prediction, the reference pixels existing neighboring the luma block corresponding to the chroma prediction target block and the reference pixels existing neighboring the chroma prediction target block are sub-sampled based on the luma intra prediction mode. For this reason, the reference pixels can be sub-sampled based on a luma component prediction method, and therefore the number of pixels to be referenced in order to reduce redundancy among color components can be halved, while considering characteristics of the image. Accordingly, the number of reference pixels to be referenced in order to reduce redundancy among color components can be reduced, while suppressing degradation in encoding performance.

Effects of the Invention

According to the present invention, the number of reference pixels to be referenced in order to reduce redundancy among color components can be reduced, while suppressing degradation in encoding performance.

BRIEF DESCRIPTION OF DRAWINGS

FIG. 15 is a block diagram of a video encoding device according to a conventional example;

FIG. 21 is a diagram for illustrating operations of intra prediction units provided in a video encoding device and a video decoding device according to a conventional example;

FIG. 24 is a diagram for illustrating operations of intra prediction units provided in a video encoding device and a video decoding device according to a conventional example.

MODE FOR CARRYING OUT THE INVENTION

Hereinafter, modes for carrying out the present invention will be described with reference to the drawings. Note that constituent elements in the following embodiments can be replaced with existing constituent elements or the like as appropriate, and various variations including combinations with other existing constituent elements are possible. Accordingly, the descriptions of the following embodiments do not limit the content of the invention stated in the claims.

First Embodiment

Configuration and Operations of Video Encoding Device AA

Figure 1:
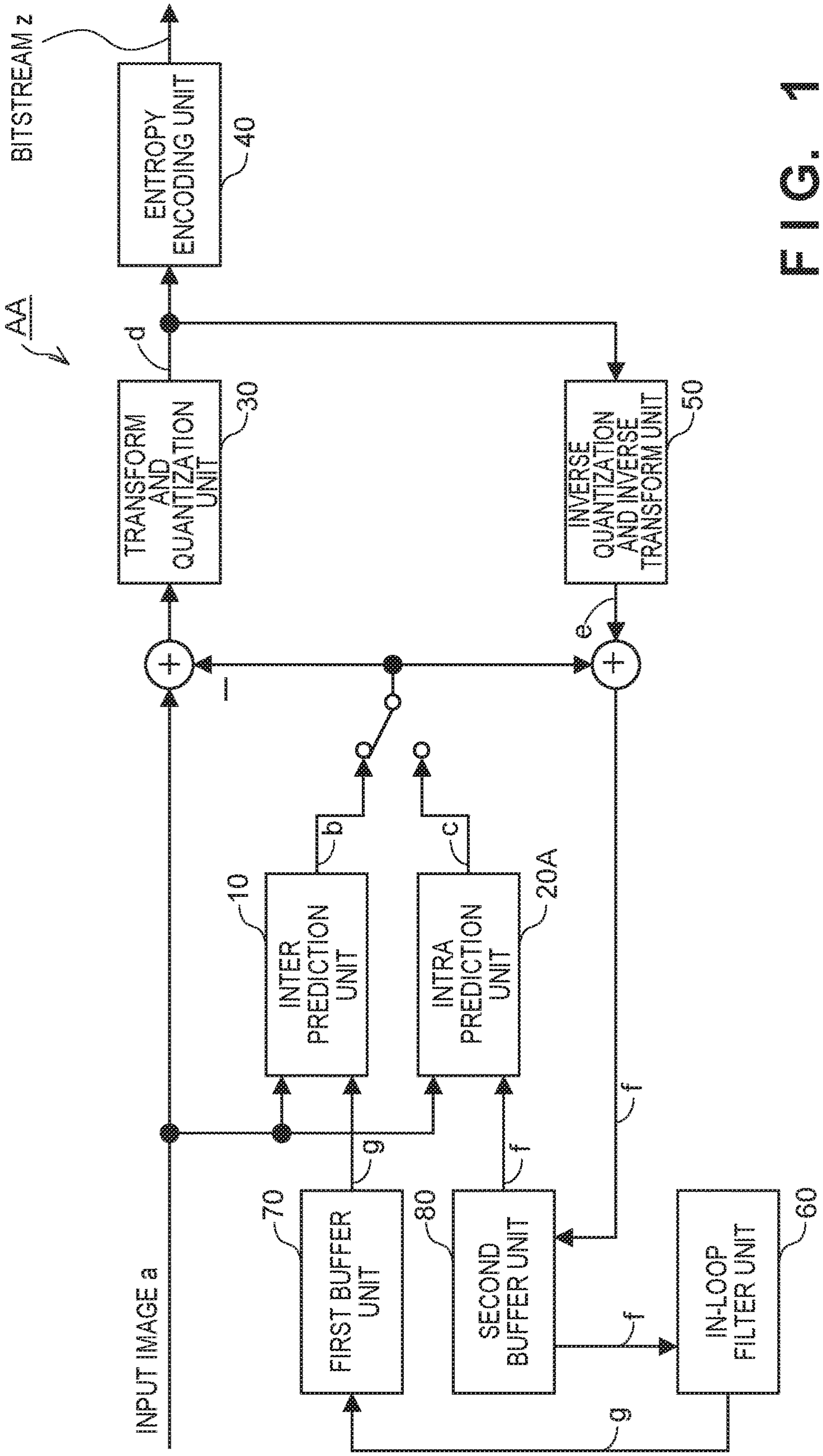
FIG. 1 is a block diagram of a video encoding device according to a first embodiment of the present invention.

FIG. 1 is a block diagram of a video encoding device AA according to a first embodiment of the present invention. The video encoding device AA is different from the video encoding device MM according to the conventional example shown in FIG. 15 in that an intra prediction unit 20A is provided in place of the intra prediction unit 20. Note that the same constituent elements of the video encoding device AA as those of the video encoding device MM are assigned the same signs, and descriptions thereof will be omitted.

Figure 2:
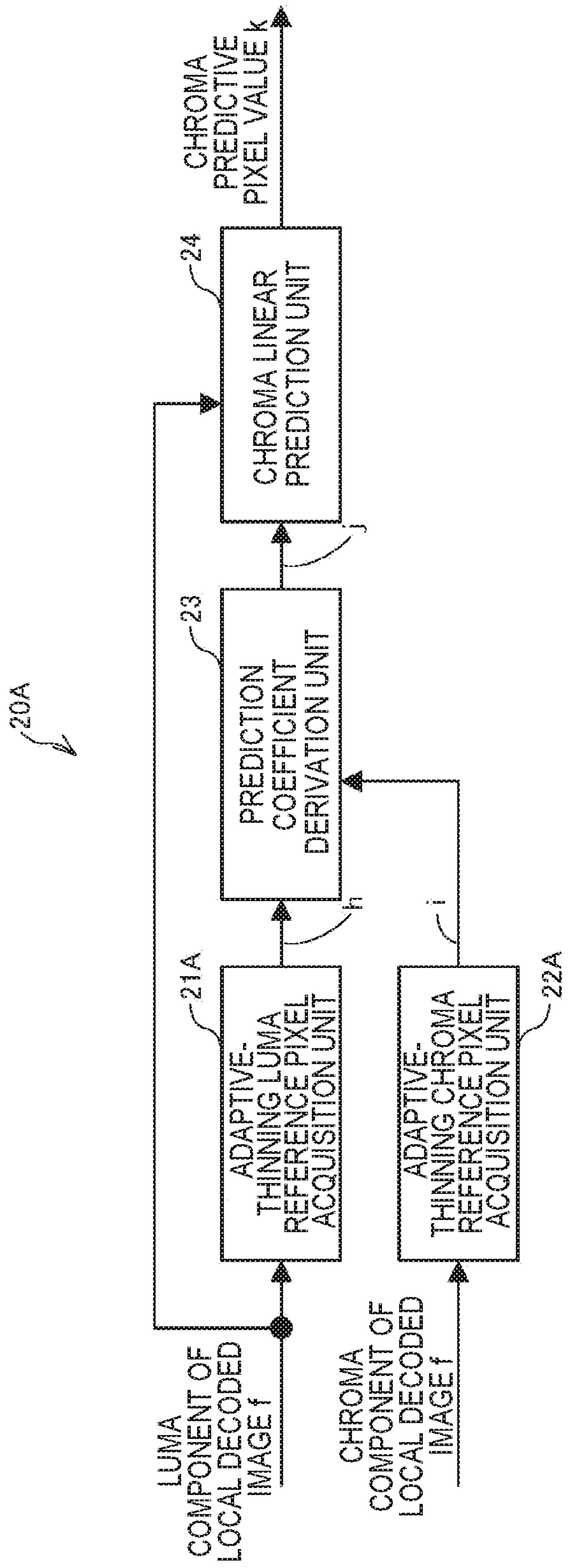
FIG. 2 is a block diagram of an intra prediction unit provided in the video encoding device according to the aforementioned embodiment.
Figure 20:
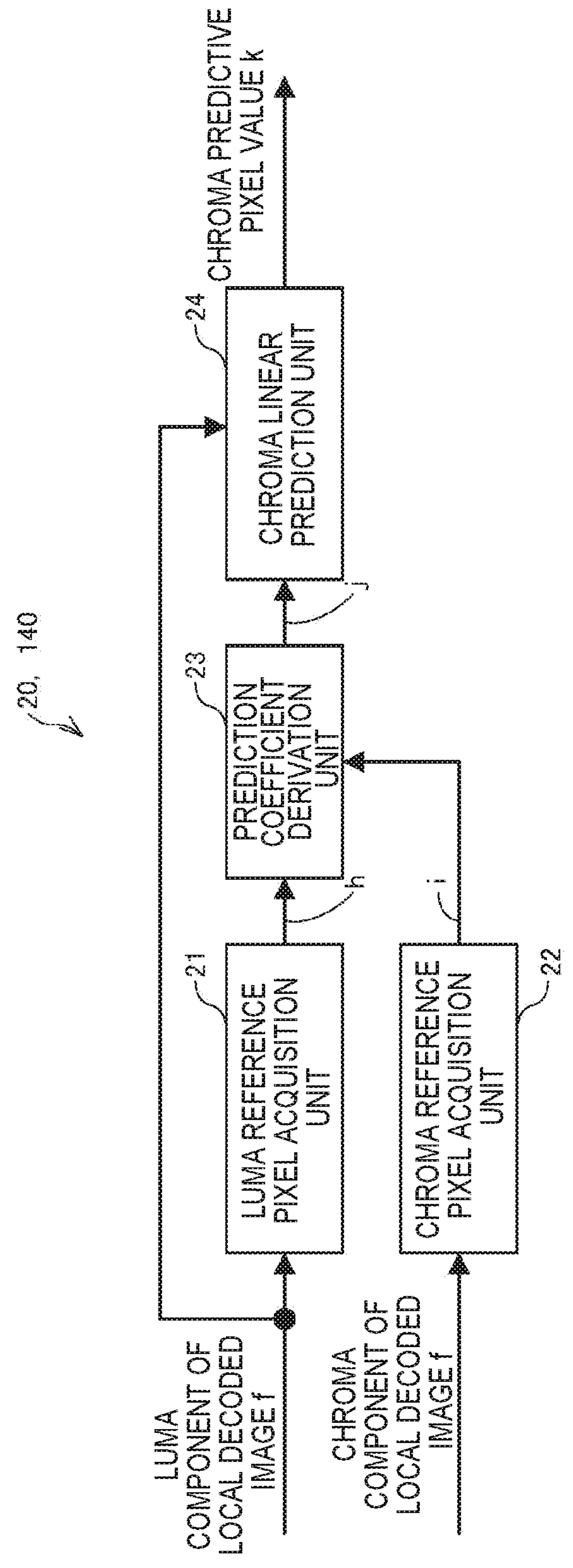
FIG. 20 is a block diagram of an intra prediction unit provided in a video encoding device and a video decoding device according to a conventional example.
Figure 22:
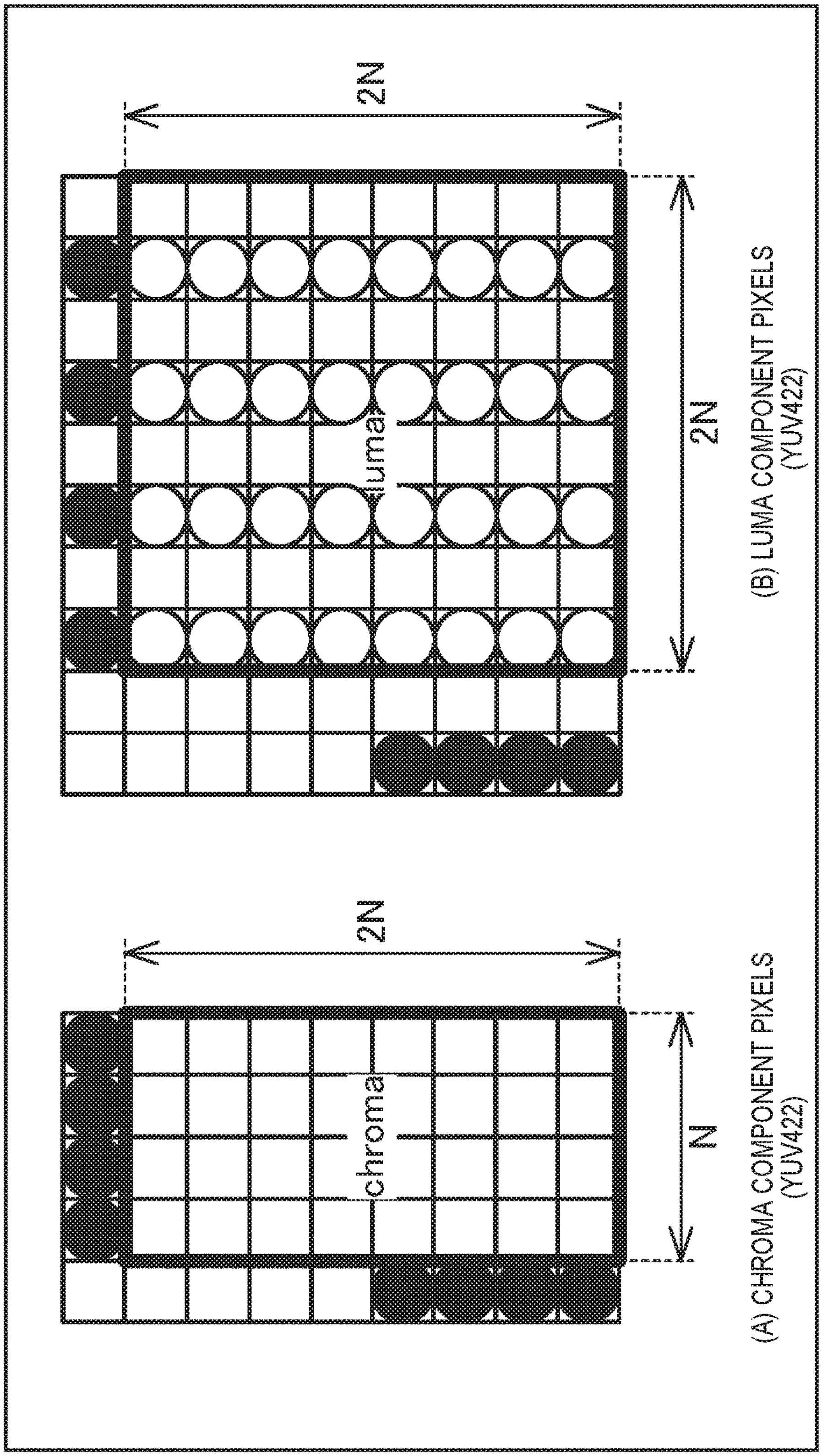
FIG. 22 is a diagram for illustrating operations of intra prediction units provided in a video encoding device and a video decoding device according to a conventional example.
Figure 23:
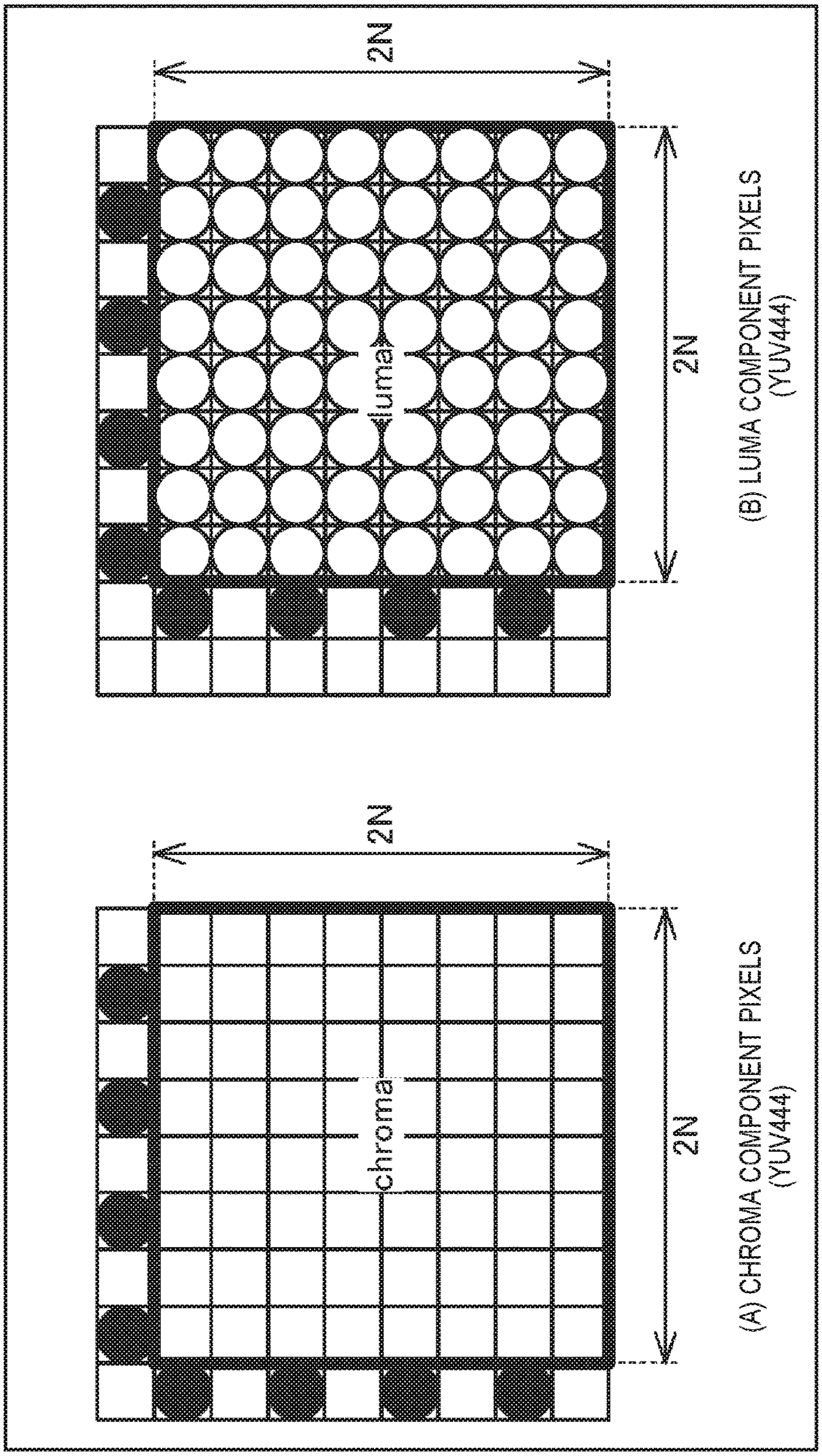
FIG. 23 is a diagram for illustrating operations of intra prediction units provided in a video encoding device and a video decoding device according to a conventional example.

FIG. 2 is a block diagram of the intra prediction unit 20A. The intra prediction unit 20A is different from the intra prediction unit 20 according to the conventional example shown in FIG. 20 in that an adaptive-sub-sampling luma reference pixel acquisition unit 21A is provided in place of the luma reference pixel acquisition unit 21, and in that an adaptive-sub-sampling chroma reference pixel acquisition unit 22A is provided in place of the chroma reference pixel acquisition unit 22.

A luma component of a local decoded image f is input to the adaptive-sub-sampling luma reference pixel acquisition unit 21A. This adaptive-sub-sampling luma reference pixel acquisition unit 21A performs processing appropriate for the encoding unit, and generates and outputs a luma reference pixel value h.

Specifically, in the case where the encoding unit is other than the smallest CU block, which is the smallest encoding unit of CUs, the adaptive-sub-sampling luma reference pixel acquisition unit 21A acquires a pixel value of each reference pixel existing neighboring a luma block corresponding to a chroma prediction target block, adjusts the phase thereof, and outputs the phase-adjusted pixel value as a luma reference pixel value h.

On the other hand, in the case where an input image a is an image of a non-YUV420 format and the encoding unit is the smallest CU block, the adaptive-sub-sampling luma reference pixel acquisition unit 21A initially determines a luma intra prediction mode such that the input image a is most resembled using the local decoded image f. Next, the adaptive-sub-sampling luma reference pixel acquisition unit 21A sub-samples reference pixels existing neighboring the luma block corresponding to the chroma prediction target block based on the luma intra prediction mode, acquires a pixel value of each of the sub-sampled reference pixels, and outputs the acquired pixel value as a luma reference pixel value h.

A chroma component of the local decoded image f is input to the adaptive-sub-sampling chroma reference pixel acquisition unit 22A. This adaptive-sub-sampling chroma reference pixel acquisition unit 22A performs processing appropriate for the encoding unit, and generates and outputs a chroma reference pixel value i.

Specifically, in the case where the encoding unit is other than the smallest CU block, the adaptive-sub-sampling chroma reference pixel acquisition unit 22A acquires a pixel value of each reference pixel exiting neighboring the chroma prediction target block, and outputs the acquired pixel value as the chroma reference pixel value i.

On the other hand, in the case where the input image a is an image of a non-YUV420 format and the encoding unit is the smallest CU block, the adaptive-sub-sampling chroma reference pixel acquisition unit 22A initially determines a luma intra prediction mode such that the input image a is most resembled using the local decoded image f. Next, the adaptive-sub-sampling chroma reference pixel acquisition unit 22A sub-samples the reference pixels existing neighboring the chroma prediction target block based on the luma intra prediction mode, acquires a pixel value of each of the sub-sampled reference pixels, and outputs the acquired pixel value as a chroma reference pixel value i.

The sub-sampling of the reference pixels based on the luma intra prediction mode performed by the adaptive-sub-sampling luma reference pixel acquisition unit 21A and the adaptive-sub-sampling chroma reference pixel acquisition unit 22A will be described below. Here, the luma component prediction method can be determined by referencing the luma intra prediction mode.

Figure 3:
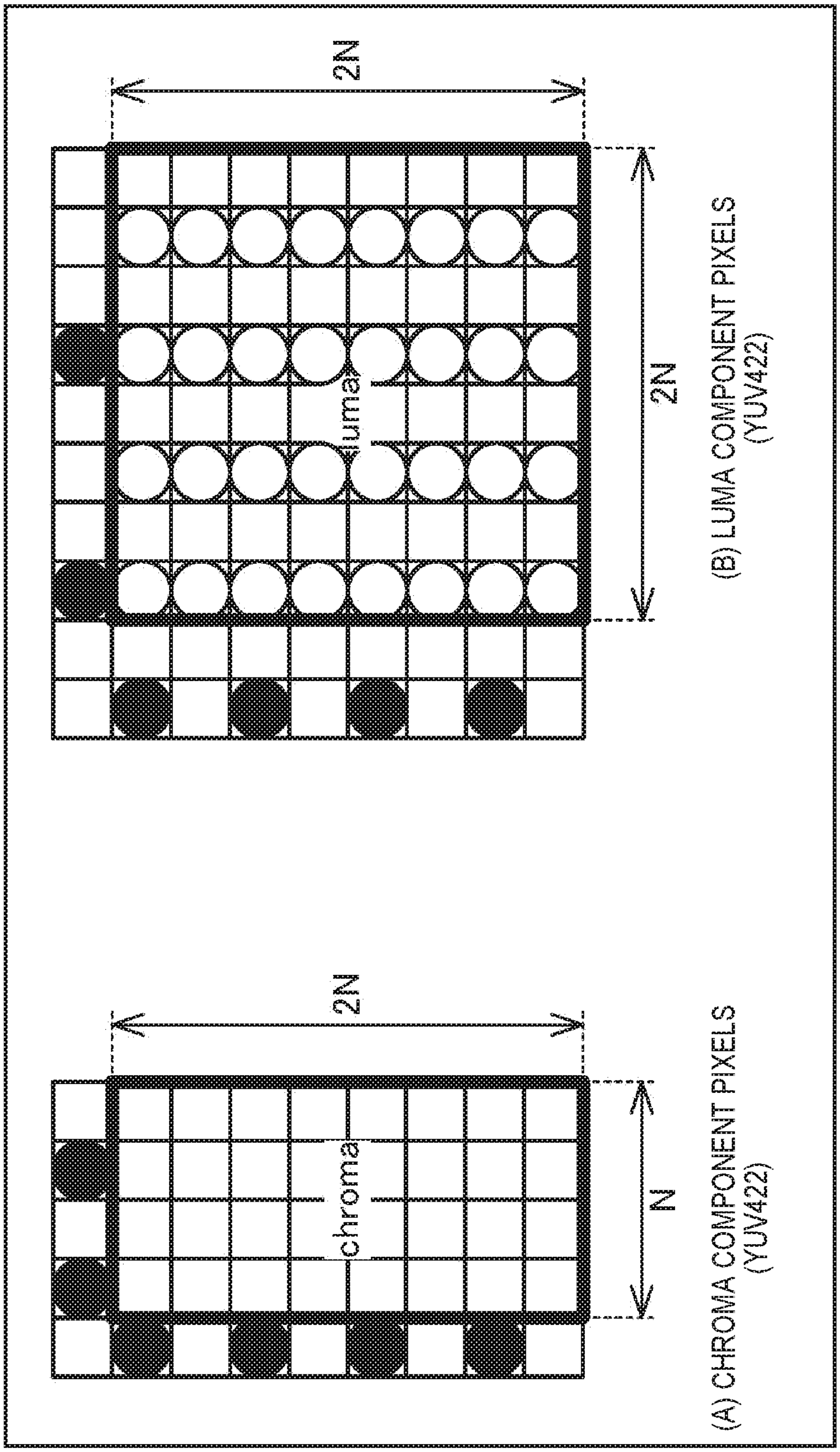
FIG. 3 is a diagram for illustrating operations of the intra prediction unit provided in the video encoding device according to the aforementioned embodiment.
Figure 6:
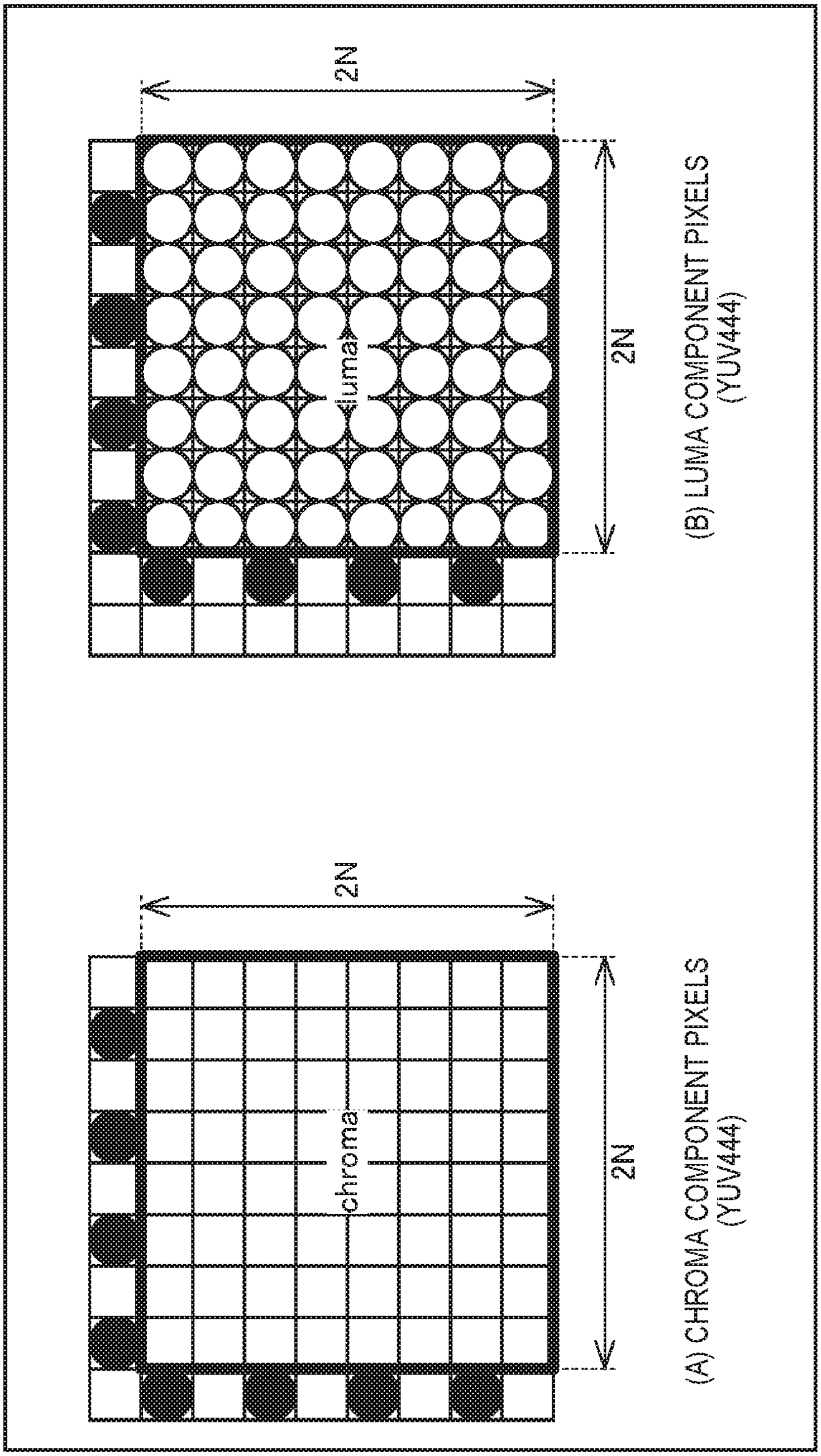
FIG. 6 is a diagram for illustrating operations of the intra prediction unit provided in the video encoding device according to the aforementioned embodiment.
Figure 17:
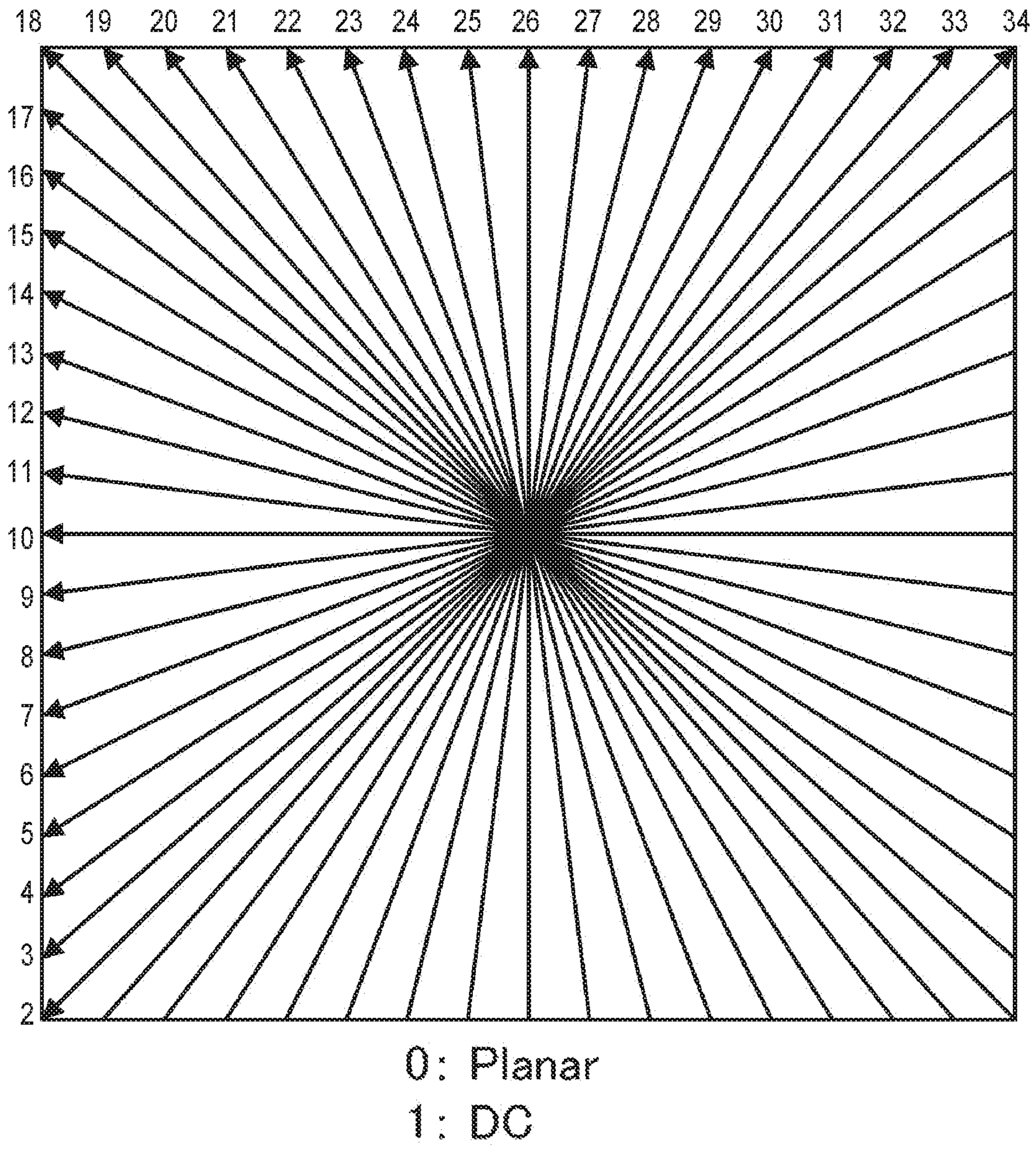
FIG. 17 is a diagram for illustrating a luma component prediction method.
Figure 18:
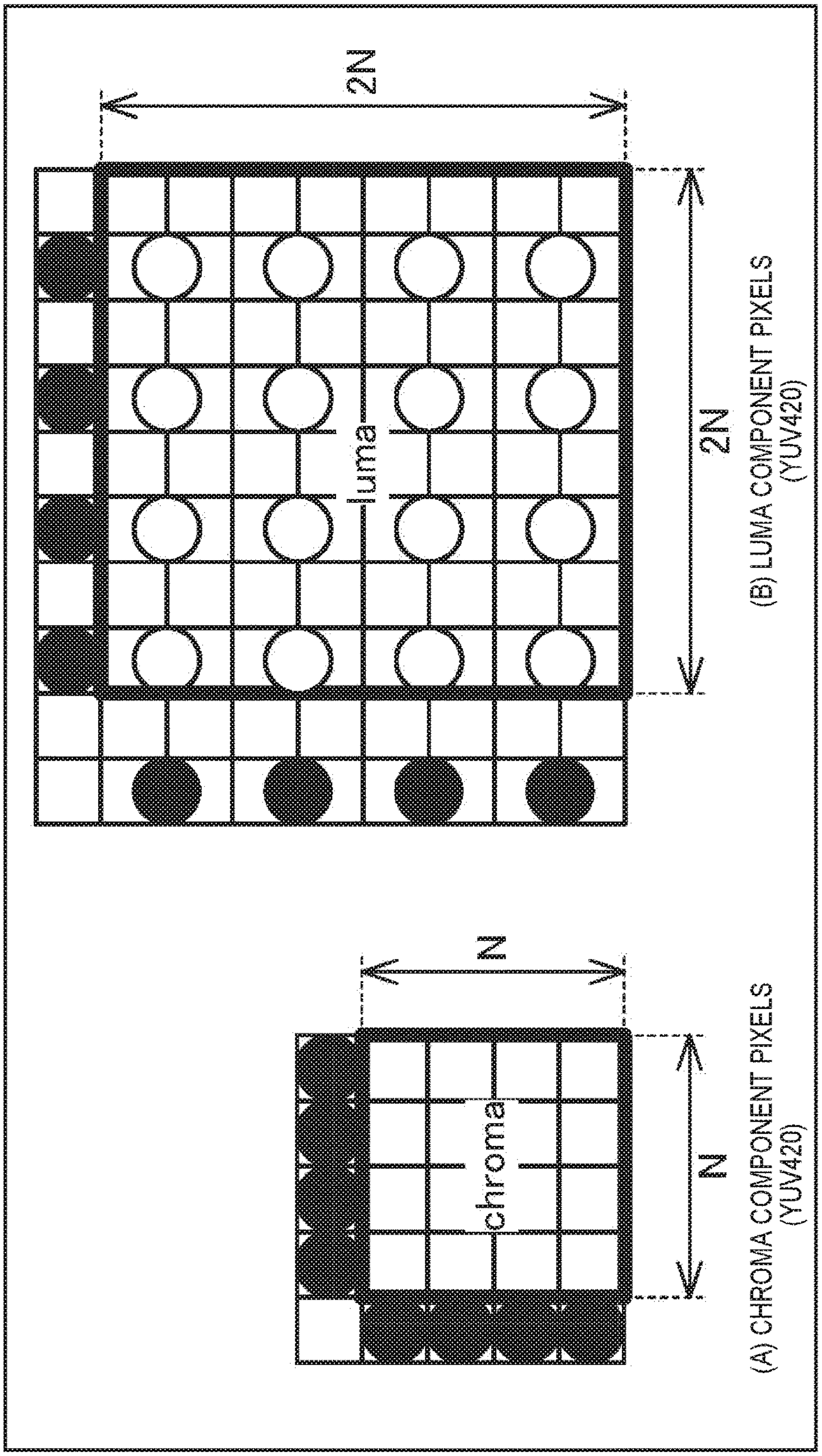
FIG. 18 is a diagram for illustrating operations of intra prediction units provided in a video encoding device and a video decoding device according to a conventional example.
Figure 19:
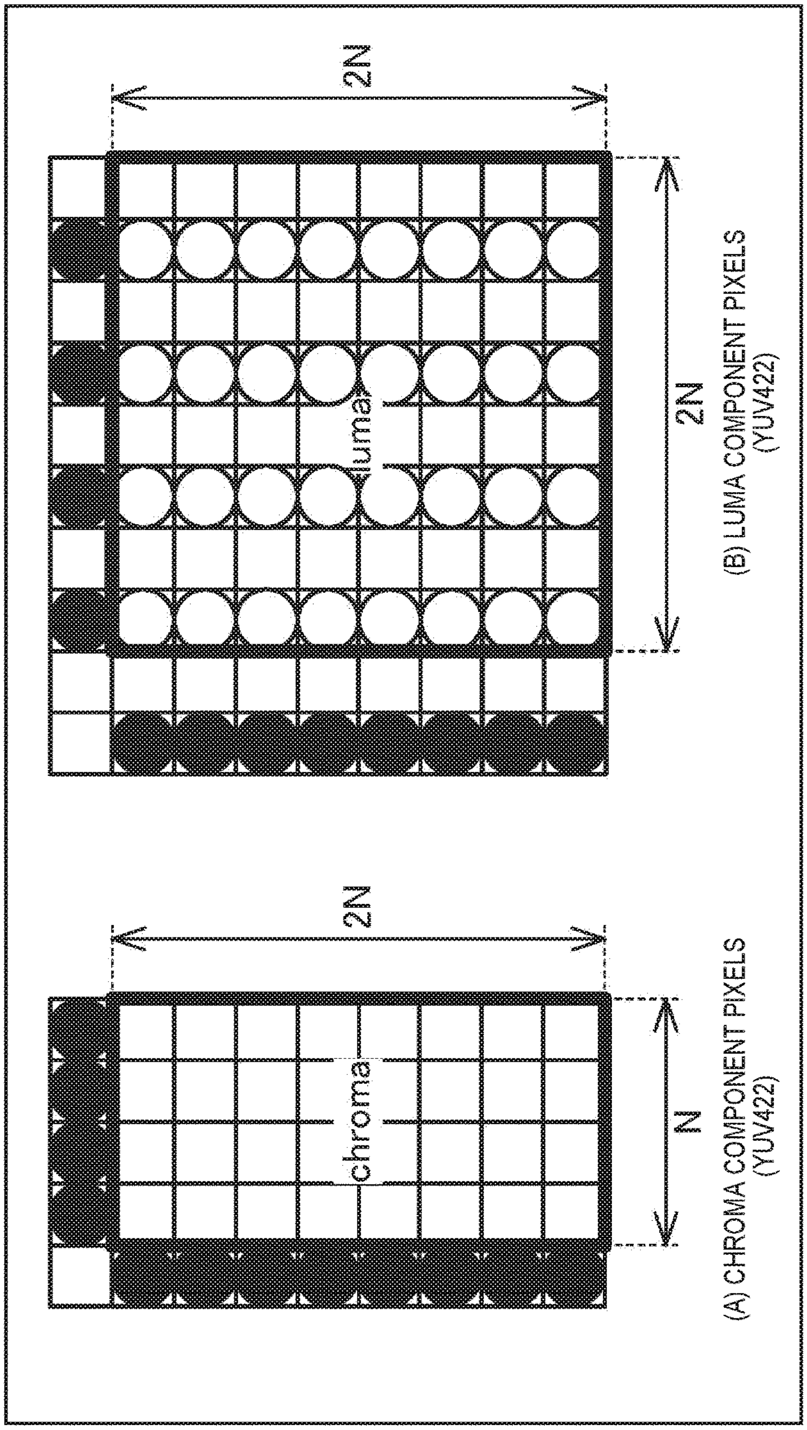
FIG. 19 is a diagram for illustrating operations of intra prediction units provided in a video encoding device and a video decoding device according to a conventional example.

For this reason, in the case where the luma component prediction method is DC, Planar, or direction prediction for an oblique direction, the adaptive-sub-sampling luma reference pixel acquisition unit 21A uniformly sub-samples the reference pixels existing neighboring the luma block corresponding to the chroma prediction target block to acquire pixel values of the sub-sampled reference pixels, and the adaptive-sub-sampling chroma reference pixel acquisition unit 22A uniformly sub-samples the reference pixels existing neighboring the chroma prediction target block to acquire pixel values of the sub-sampled reference pixels. Regarding this case, FIG. 3 shows a case where the input image a is an image of a YUV422 format, and FIG. 6 shows a case where the input image a is an image of a YUV444 format. FIGS. 3 and 6 indicate that, as a result of the reference pixels being uniformly sub-sampled, the pixel value of every other reference pixel is acquired. Note that the case of direction prediction for an oblique direction refers to the case of prediction modes 15 to 21 in FIG. 17.

Figure 4:
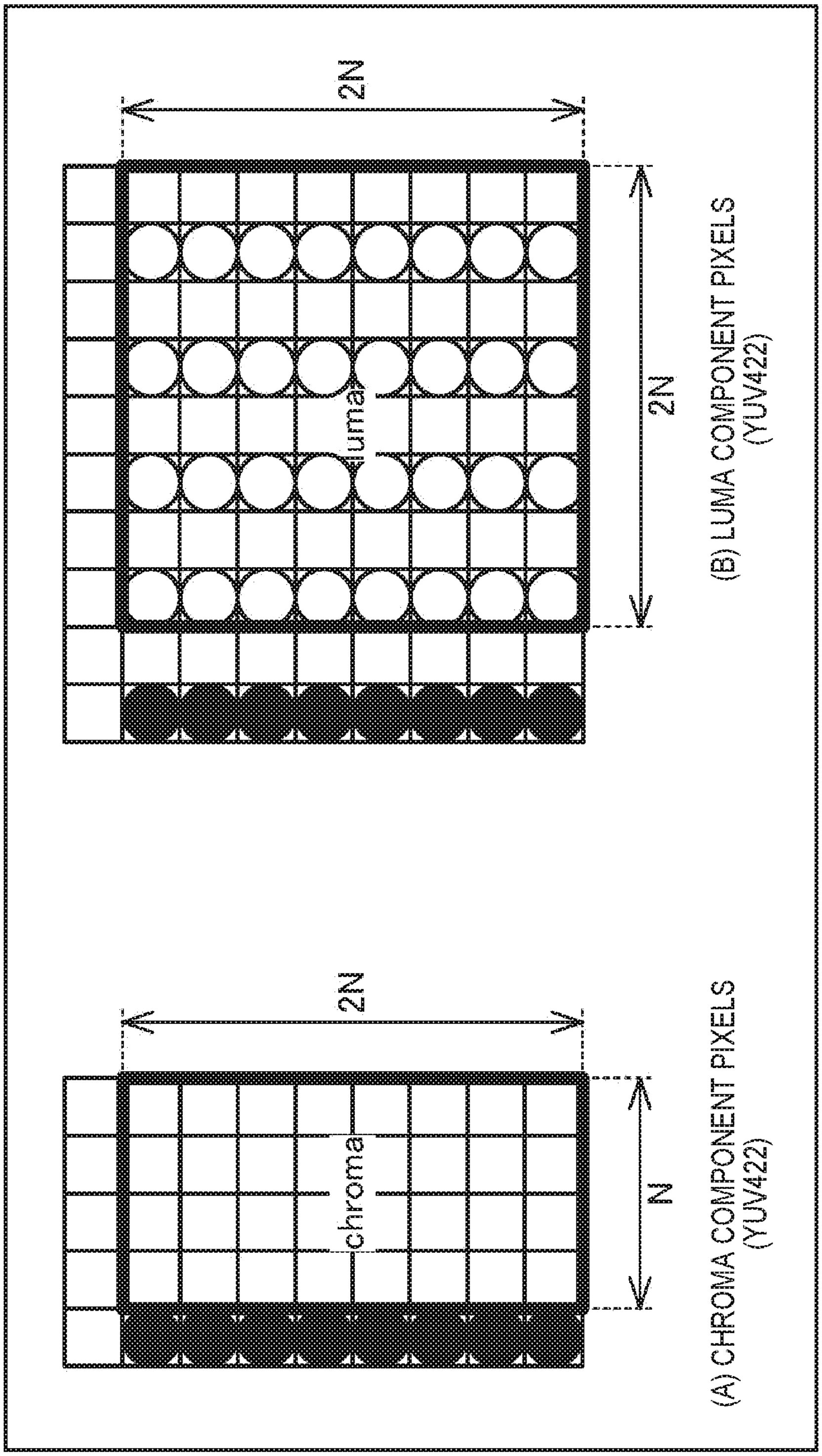
FIG. 4 is a diagram for illustrating operations of the intra prediction unit provided in the video encoding device according to the aforementioned embodiment.
Figure 7:
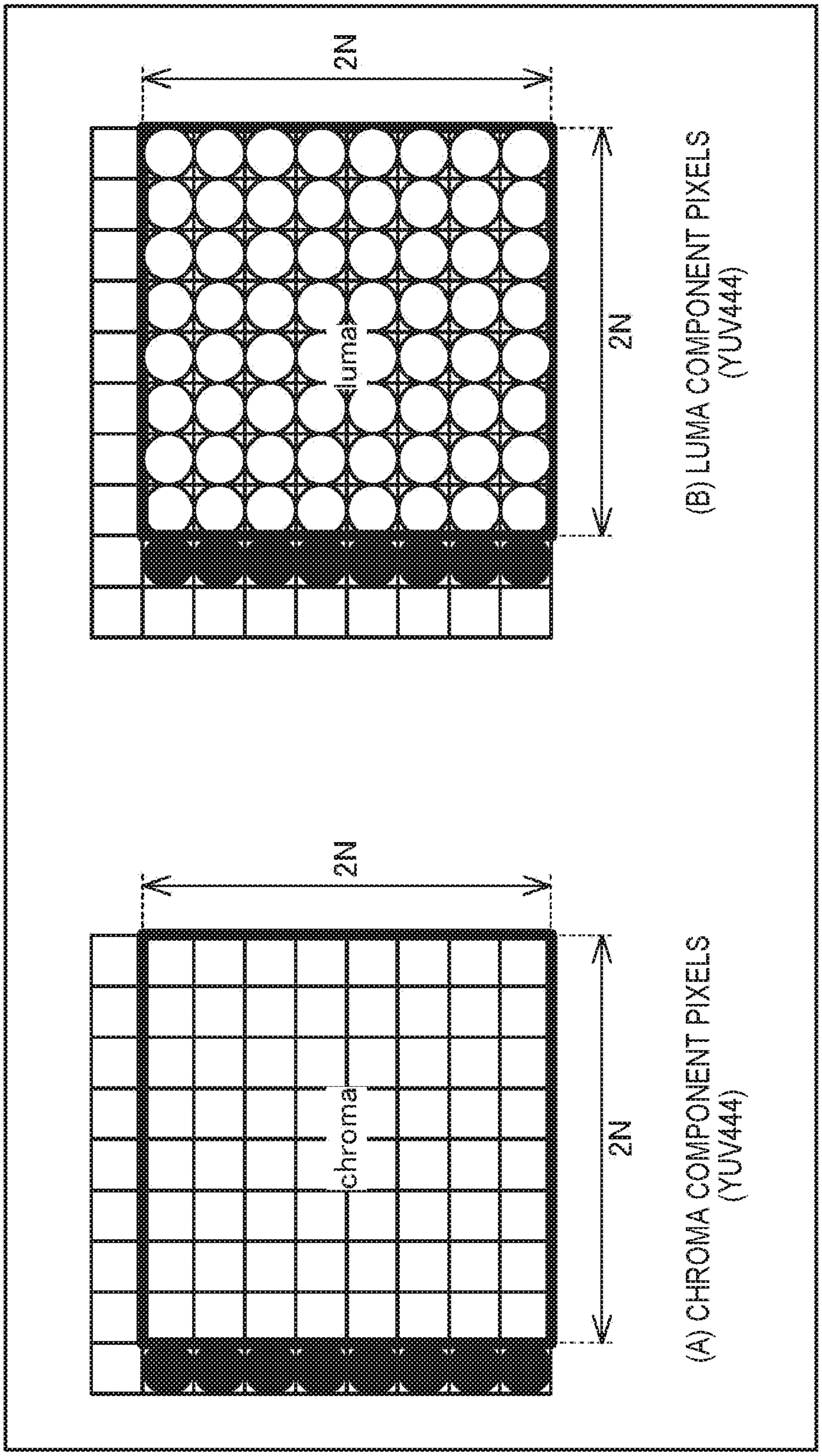
FIG. 7 is a diagram for illustrating operations of the intra prediction unit provided in the video encoding device according to the aforementioned embodiment.

In the case where the luma component prediction method is prediction for a horizontal direction or a direction close to a horizontal direction, the adaptive-sub-sampling luma reference pixel acquisition unit 21A acquires pixel values of only reference pixels on the left side of the luma block corresponding to the chroma prediction target block, and the adaptive-sub-sampling chroma reference pixel acquisition unit 22A acquires pixel values of only reference pixels on the left side of the chroma prediction target block. Regarding this case, FIG. 4 shows a case where the input image a is an image of a YUV422 format, and FIG. 7 shows a case where the input image a is an image of a YUV444 format. Note that the case of prediction for a horizontal direction or a direction close to a horizontal direction refers to the case of prediction modes 2 to 14 in FIG. 17.

Figure 5:
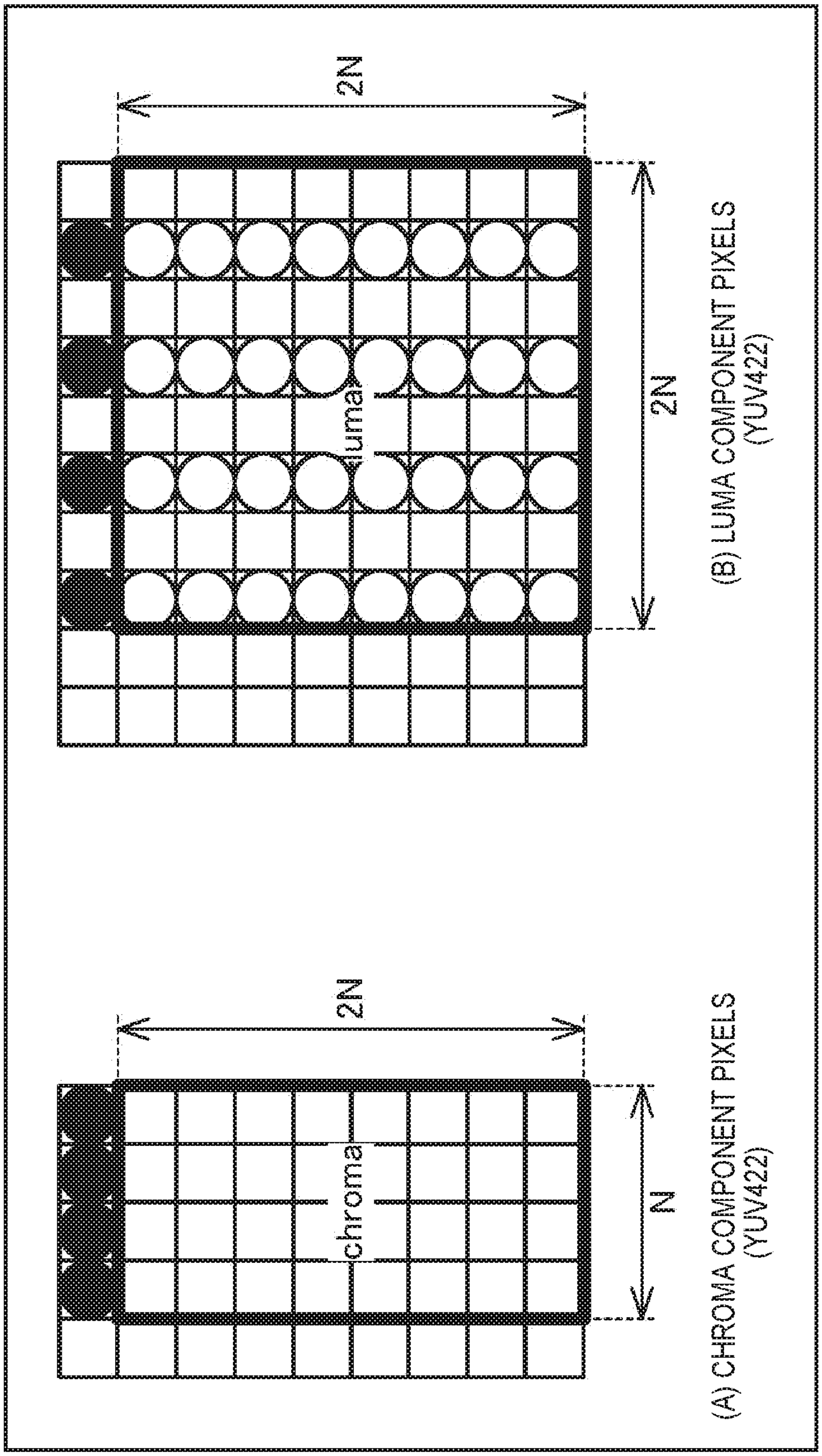
FIG. 5 is a diagram for illustrating operations of the intra prediction unit provided in the video encoding device according to the aforementioned embodiment.
Figure 8:
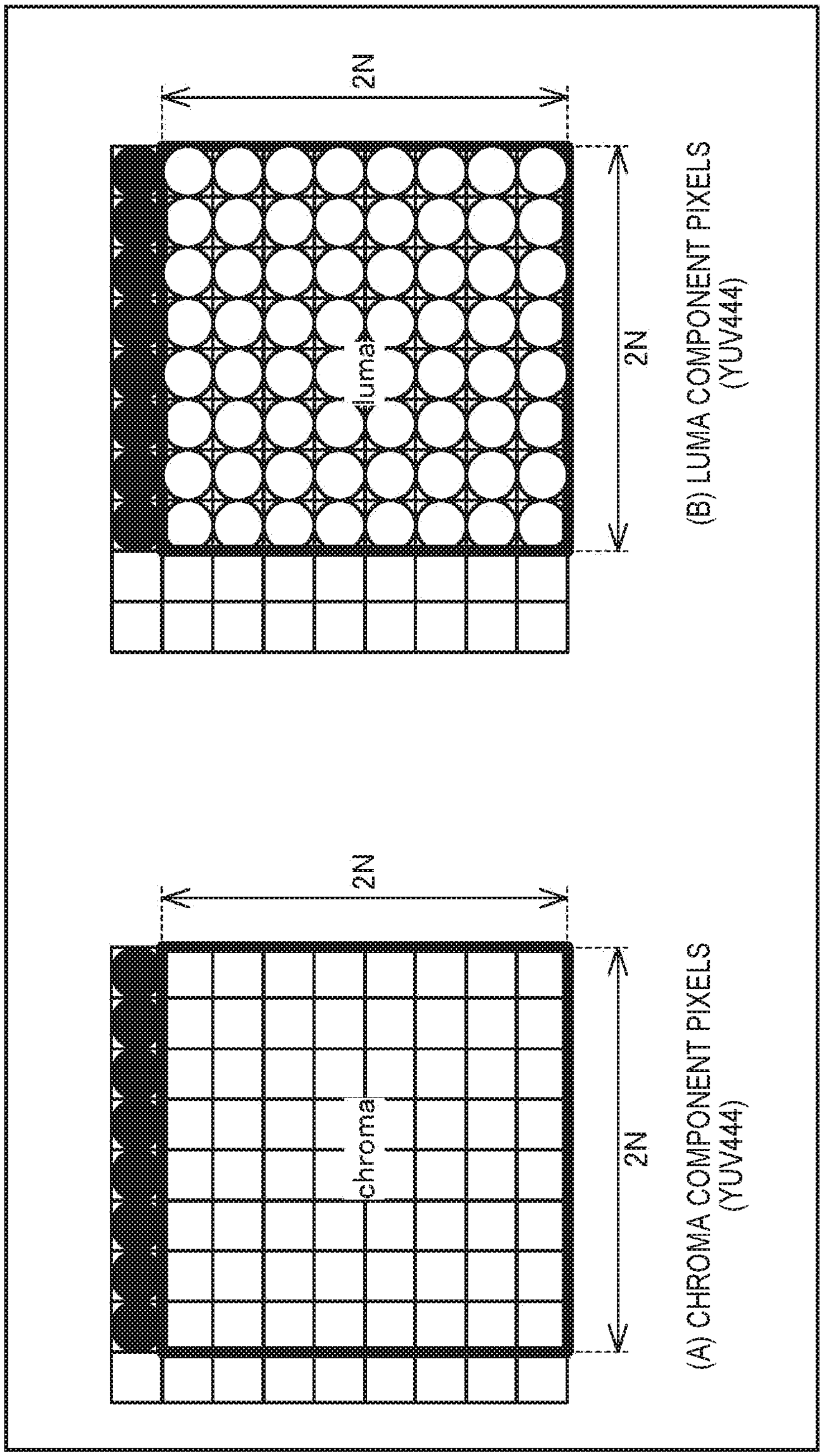
FIG. 8 is a diagram for illustrating operations of the intra prediction unit provided in the video encoding device according to the aforementioned embodiment.

In the case where the luma component prediction method is prediction for a vertical direction or a direction close to a vertical direction, the adaptive-sub-sampling luma reference pixel acquisition unit 21A acquires pixel values of only reference pixels above the luma block corresponding to the chroma prediction target block, and the adaptive-sub-sampling chroma reference pixel acquisition unit 22A acquires pixel values of only reference pixels above the chroma prediction target block. Regarding this case, FIG. 5 shows a case where the input image a is an image of a YUV422 format, and FIG. 8 shows a case where the input image a is an image of a YUV444 format. Note that the case of prediction for a vertical direction or a direction close to a vertical direction refers to the case of prediction modes 22 to 34 in FIG. 17.

[Configuration and Operations of Video Decoding Device BB]

Figure 9:
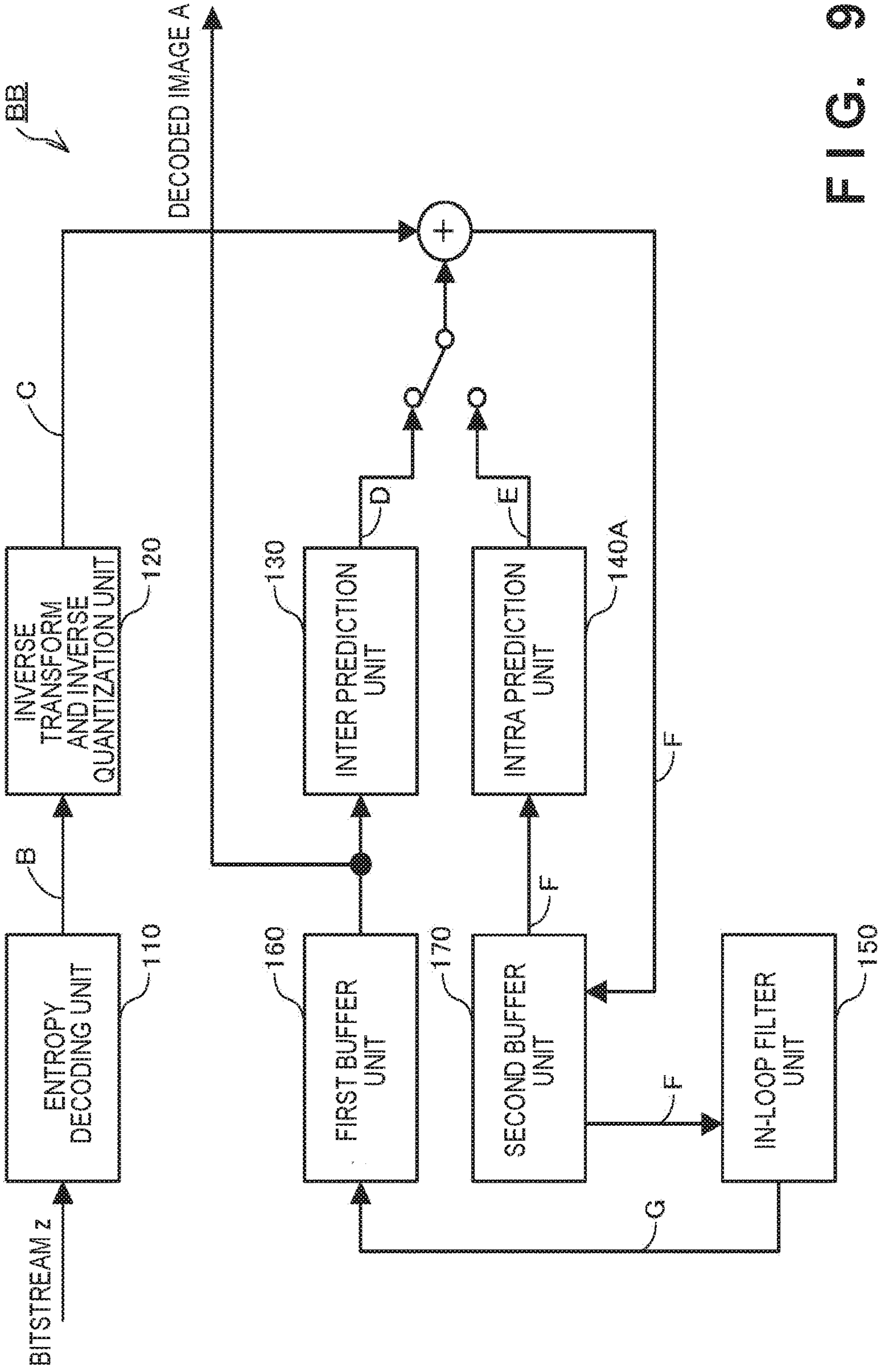
FIG. 9 is a block diagram of a video decoding device according to the first embodiment of the present invention.
Figure 16:
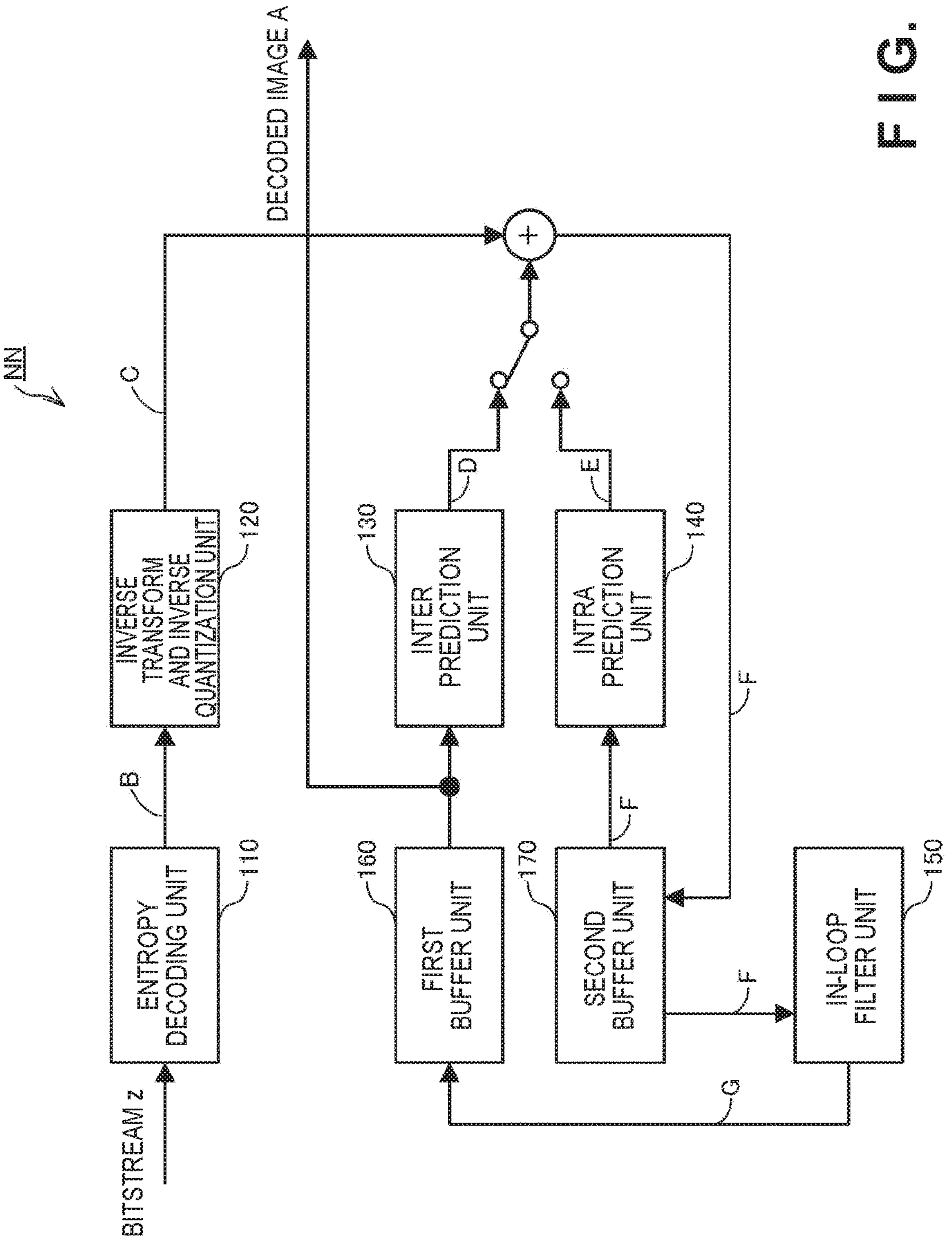
FIG. 16 is a block diagram of a video decoding device according to a conventional example.

FIG. 9 is a block diagram of a video decoding device BB according to the first embodiment of the present invention. The video decoding device BB is different from the video decoding device NN according to the conventional example shown in FIG. 16 in that an intra prediction unit 140A is provided in place of the intra prediction unit 140. Note that the same constituent elements of the video decoding device BB as those of the video decoding device NN are assigned the same signs, and descriptions thereof will be omitted.

The intra prediction unit 140A includes the adaptive-sub-sampling luma reference pixel acquisition unit 21A, the adaptive-sub-sampling chroma reference pixel acquisition unit 22A, the prediction coefficient derivation unit 23, and the chroma linear prediction unit 24 that are shown in FIG. 2, as the intra prediction unit 20A does.

Note that the adaptive-sub-sampling luma reference pixel acquisition unit 21A provided in the video encoding device AA performs processing appropriate for the encoding unit, whereas the adaptive-sub-sampling luma reference pixel acquisition unit 21A provided in the video decoding device BB performs processing appropriate for the decoding unit.

Specifically, in the case where the decoding unit is other than the smallest CU block, the adaptive-sub-sampling luma reference pixel acquisition unit 21A acquires a pixel value of each reference pixel existing neighboring the luma block corresponding to the chroma prediction target block to adjust the phase thereof, and outputs the phase-adjusted pixel value as a luma reference pixel value.

On the other hand, in the case where the input image a is an image of a non-YUV420 format and the decoding unit is the smallest CU block, the adaptive-sub-sampling luma reference pixel acquisition unit 21A determines the luma intra prediction mode, sub-samples the reference pixels existing neighboring the luma block corresponding to the chroma prediction target block based on the luma intra prediction mode, acquires a pixel value of each of the sub-sampled reference pixels, and outputs the acquired pixel value as a luma reference pixel value.

Also, the adaptive-sub-sampling chroma reference pixel acquisition unit 22A provided in the video encoding device AA performs processing appropriate for the encoding unit, whereas the adaptive-sub-sampling chroma reference pixel acquisition unit 22A provided in the video decoding device BB performs processing appropriate for the decoding unit.

Specifically, in the case where the decoding unit is other than the smallest CU block, the adaptive-sub-sampling chroma reference pixel acquisition unit 22A acquires a pixel value of each reference pixel existing neighboring the chroma prediction target block, and outputs the acquired pixel value as a chroma reference pixel value.

On the other hand, in the case where the input image a is an image of a non-YUV420 format and the decoding unit is the smallest CU block, the adaptive-sub-sampling chroma reference pixel acquisition unit 22A determines the luma intra prediction mode, sub-samples the reference pixels existing neighboring the chroma prediction target block based on the luma intra prediction mode, acquires a pixel value of each of the sub-sampled reference pixels, and outputs the acquired pixel value as a chroma reference pixel value.

With the above-described video encoding device AA and video decoding device BB, the following effect can be achieved.

In the case where the encoding unit is the smallest CU block, the video encoding device AA sub-samples, using the adaptive-sub-sampling luma reference pixel acquisition unit 21A, reference pixels existing neighboring the luma block corresponding to the chroma prediction target block based on the luma intra prediction mode, thereby sub-sampling these reference pixels based on the luma component prediction method. Also, in the case where the encoding unit is the smallest CU block, the video encoding device AA sub-samples, using the adaptive-sub-sampling chroma reference pixel acquisition unit 22A, reference pixels existing neighboring the chroma prediction target block based on the luma intra prediction mode, thereby sub-sampling these reference pixels based on the luma component prediction method.

In the case where the decoding unit is the smallest CU block, the video decoding device BB sub-samples, using the adaptive-sub-sampling luma reference pixel acquisition unit 21A, reference pixels existing neighboring the luma block corresponding to the chroma prediction target block based on the luma intra prediction mode, thereby sub-sampling these reference pixels based on the luma component prediction method. Also, in the case where the decoding unit is the smallest CU block, the video decoding device BB sub-samples, using the adaptive-sub-sampling chroma reference pixel acquisition unit 22A, reference pixels existing neighboring the chroma prediction target block based on the luma intra prediction mode, thereby sub-sampling these reference pixels based on the luma component prediction method.

With the above-described configuration, the video encoding device AA and the video decoding device BB can halve the number of pixels to be referenced in order to reduce redundancy among color components, while considering characteristics of an image. Accordingly, the number of reference pixels to be referenced in order to reduce redundancy among color components can be reduced, while suppressing degradation in encoding performance.

Second Embodiment

Configuration and Operations of Video Encoding Device CC

A video encoding device CC according to a second embodiment of the present invention will be described below. The video encoding device CC is different from the video encoding device AA according to the first embodiment of the present invention shown in FIG. 1 in that an intra prediction unit 20B is provided in place of the intra prediction unit 20A. Note that the same constituent elements of the video encoding device CC as those of the video encoding device AA will be assigned the same signs, and descriptions thereof will be omitted.

The intra prediction unit 20B is different from the intra prediction unit 20A according to the first embodiment of the present invention shown in FIG. 1 in that an adaptive-sub-sampling luma reference pixel acquisition unit 21B is provided in place of the adaptive-sub-sampling luma reference pixel acquisition unit 21A, and in that an adaptive-sub-sampling chroma reference pixel acquisition unit 22B is provided in place of the adaptive-sub-sampling chroma reference pixel acquisition unit 22A.

A luma component of a local decoded image f is input to the adaptive-sub-sampling luma reference pixel acquisition unit 21B. This adaptive-sub-sampling luma reference pixel acquisition unit 21B always initially determines a luma intra prediction mode such that the input image a is most resembled using the local decoded image f, regardless of the encoding unit. Next, the adaptive-sub-sampling luma reference pixel acquisition unit 21B sub-samples reference pixels existing neighboring the luma block corresponding to the chroma prediction target block based on the luma intra prediction mode, acquires a pixel value of each of the sub-sampled reference pixels, and outputs the acquired pixel value as a luma reference pixel value h.

A chroma component of the local decoded image f is input to the adaptive-sub-sampling chroma reference pixel acquisition unit 22B. This adaptive-sub-sampling chroma reference pixel acquisition unit 22B always initially determines the luma intra prediction mode such that the input image a is most resembled using the local decoded image f, regardless of the encoding unit. Next, the adaptive-sub-sampling chroma reference pixel acquisition unit 22B sub-samples reference pixels existing neighboring the chroma prediction target block based on the luma intra prediction mode, acquires a pixel value of each of the sub-sampled reference pixels, and outputs the acquired pixel value as a chroma reference pixel value i.

Figure 10:
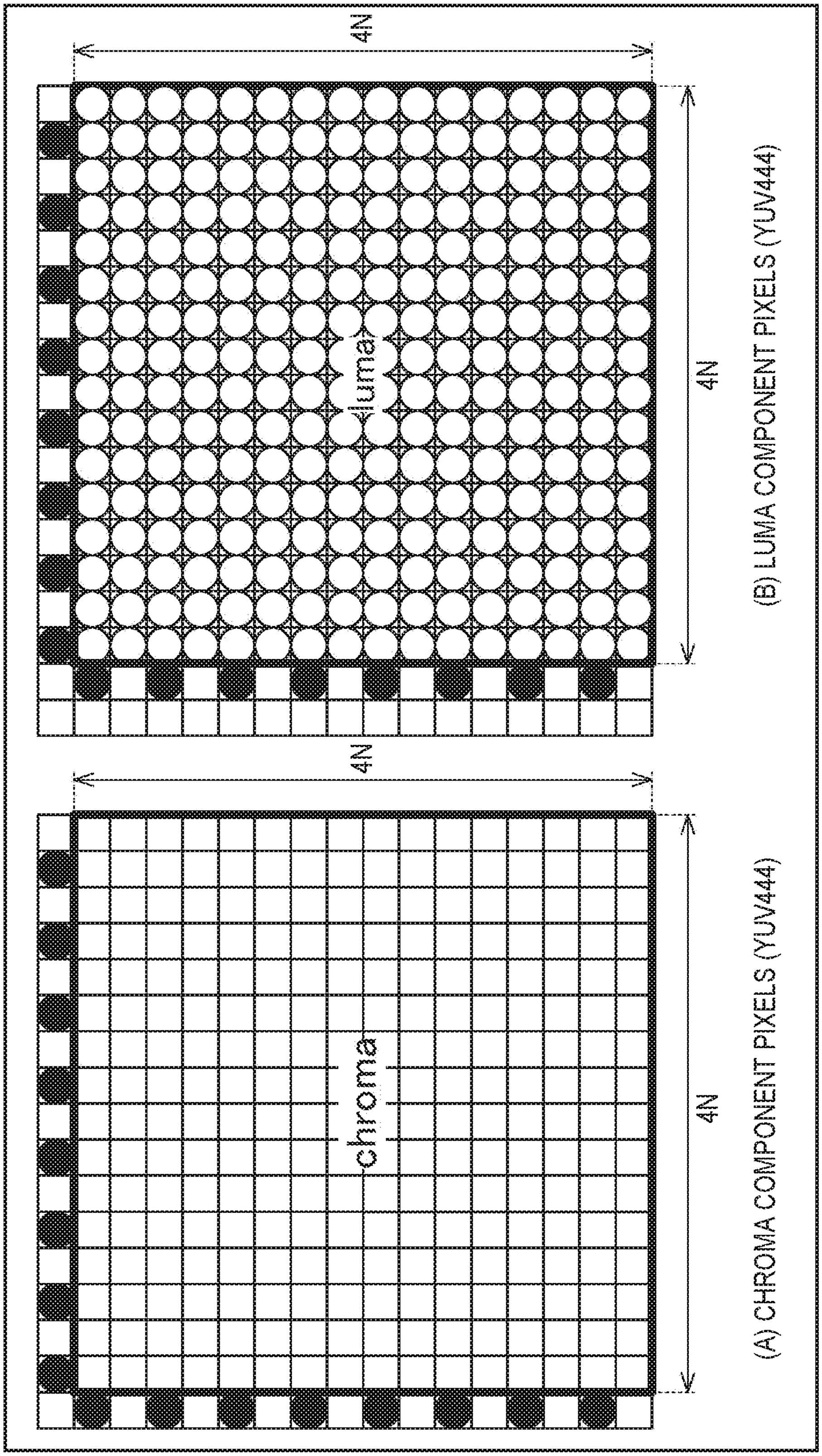
FIG. 10 is a diagram for illustrating operations of an intra prediction unit provided in a video encoding device according to a second embodiment of the present invention.

For example, FIG. 10 shows an example in which reference pixels are uniformly sub-sampled in the case where the encoding unit is the smallest TU block and the input image a is an image of a YUV444 format.

[Configuration and Operations of Video Decoding Device DD]

A video decoding device DD according to a second embodiment of the present invention will be described below. The video decoding device DD is different from the video decoding device BB according to the first embodiment of the present invention shown in FIG. 9 in that an intra prediction unit 140B is provided in place of the intra prediction unit 140A. Note that the same constituent elements of the video decoding device DD as those of the video decoding device BB are assigned the same signs, and descriptions thereof will be omitted.

The intra prediction unit 140B includes the adaptive-sub-sampling luma reference pixel acquisition unit 21B, the adaptive-sub-sampling chroma reference pixel acquisition unit 22B, the prediction coefficient derivation unit 23, and the chroma linear prediction unit 24, as the intra prediction unit 20B does.

Note that the adaptive-sub-sampling luma reference pixel acquisition unit 21B provided in the video decoding device DD always determines the luma intra prediction mode, sub-samples reference pixels existing neighboring the luma block corresponding to the chroma prediction target block based on the luma intra prediction mode, acquires a pixel value of each of the sub-sampled reference pixels, and outputs the acquired pixel value as a luma reference pixel value, regardless of the decoding unit.

Also, the adaptive-sub-sampling chroma reference pixel acquisition unit 22B provided in the video decoding device DD always determines the luma intra prediction mode, sub-samples reference pixels existing neighboring the chroma prediction target block based on the luma intra prediction mode, acquires a pixel value of each of the sub-sampled reference pixels, and outputs the acquired pixel value as a chroma reference pixel value, regardless of the decoding unit.

With the above-described video encoding device CC and video decoding device DD, the following effect can be achieved in addition to the above-described effect that can be achieved by the video encoding device AA and the video decoding device BB.

The video encoding device CC always sub-samples the reference pixels regardless of the encoding unit. Also, the video decoding device DD always sub-samples the reference pixels regardless of the decoding unit. For this reason, the reference pixels can be sub-sampled even in a larger block than the smallest CU block, and accordingly a calculation load of the prediction coefficient derivation unit 23 can be reduced.

Note that the present invention can be achieved by recording, in a computer-readable non-transitory storage medium, the processing of the video encoding device AA/CC and the video decoding device BB/DD according to the present invention, and causing the video encoding device AA/CC and the video decoding device BB/DD to read and execute a program recorded in this storage medium.

Here, for example, a nonvolatile memory such as an EPROM or a flash memory, a magnetic disk such as a hard disk, a CD-ROM, or the like can be applied as the aforementioned storage medium. The program recorded in this storage medium is read and executed by processors provided in the video encoding device AA/CC and the video decoding device BB/DD.

The aforementioned program may be transmitted from the video encoding device AA/CC and the video decoding device BB/DD in which this program is stored in the storage device to another computer system via a transmission medium or through transmitted waves in the transmission medium. Here, the "transmission medium" that transmits the program refers to a medium having a function of transmitting information, such as a network (communication network) including the Internet or a communication line including a telephone line.

The aforementioned program may be for achieving a part of the above-described functions. Furthermore, the aforementioned program may be one that can achieve the above-described functions in combination with a program that is already recorded in the video encoding device AA/CC and the video decoding device BB/DD, i.e., a so-called differential file (differential program).

Although the embodiments of this invention have been described above in detail with reference to the drawings, the detailed configurations are not limited to these embodiments, and also include designs or the like in the scope that does not depart from the gist of the invention.

Figure 11:
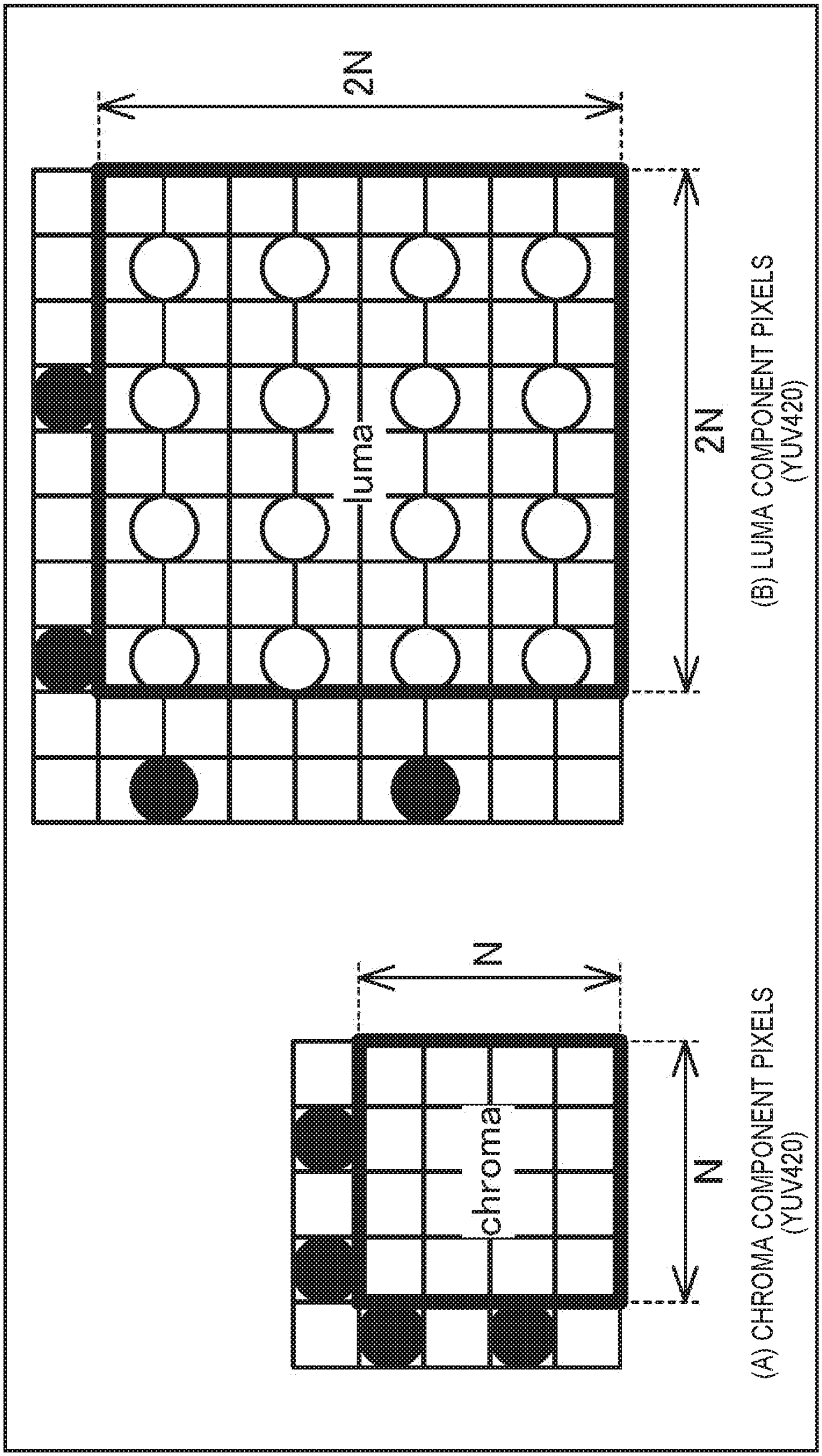
FIG. 11 is a diagram for illustrating operations of intra prediction units provided in a video encoding device and a video decoding device according to a modification of the present invention.

For example, in the above-described first embodiment, reference pixels are sub-sampled based on the luma intra prediction mode in the case where the input image a is an image of a non-YUV420 format and the encoding unit or the decoding unit is the smallest CU block. However, the present invention is not limited thereto, and for example, reference pixels may also be sub-sampled based on the luma intra prediction mode in the case where the input image a is an image of a YUV420 format and the encoding unit or the decoding unit is the smallest CU block. For example, FIG. 11 shows an example in which reference pixels are uniformly sub-sampled in the case where the input image a is an image of a YUV420 format.

In the above-described embodiments, reference pixels are sub-sampled to halve the number thereof, but the invention is not limited thereto and reference pixels may be sub-sampled to reduce the number thereof to 1/n of the number thereof before the sub-sampling (where n is any power of two that satisfies n>0). For example, FIGS. 12, 13, and 14 show cases where the input image a is an image of a YUV444 format, and reference pixels are sub-sampled to reduce the number thereof to ¼.

Figure 12:
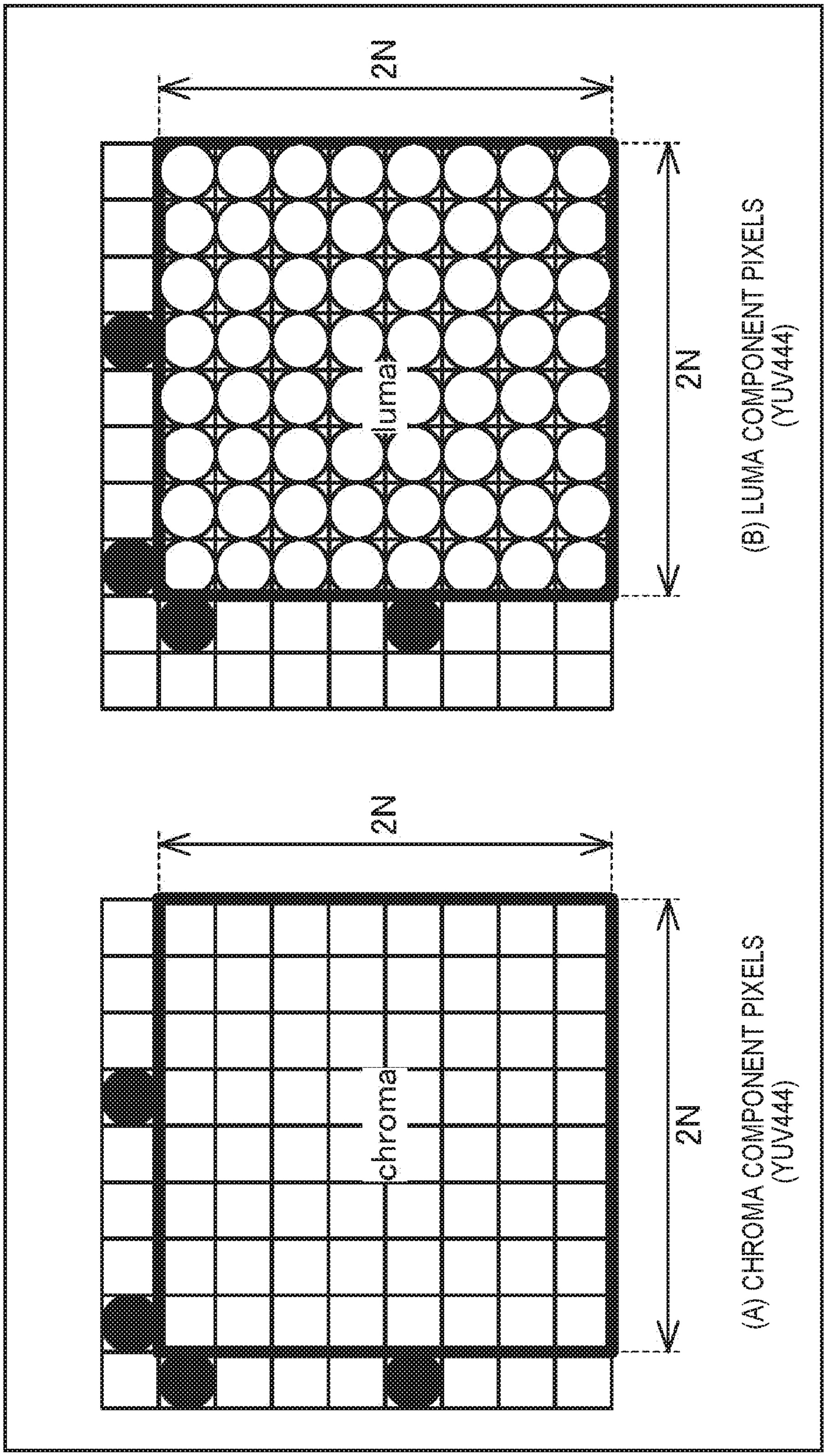
FIG. 12 is a diagram for illustrating operations of the intra prediction units provided in a video encoding device and a video decoding device according to a modification of the present invention.

In particular, FIG. 12 shows a case where the reference pixels are uniformly sub-sampled. In this example shown in FIG. 12, compared with the first embodiment of the present invention shown in FIG. 6, the pixel value of every other reference pixel is acquired, and both the number of luma reference pixels and the number of chroma reference pixels are 4 pixels. In contrast, in the conventional case of deriving parameters for each CU, both the number of luma reference pixels and the number of chroma reference pixels are 16 pixels, as described above using FIGS. 21 and 24. Accordingly, the number of reference pixels is ¼ of that in the conventional example.

Figure 13:
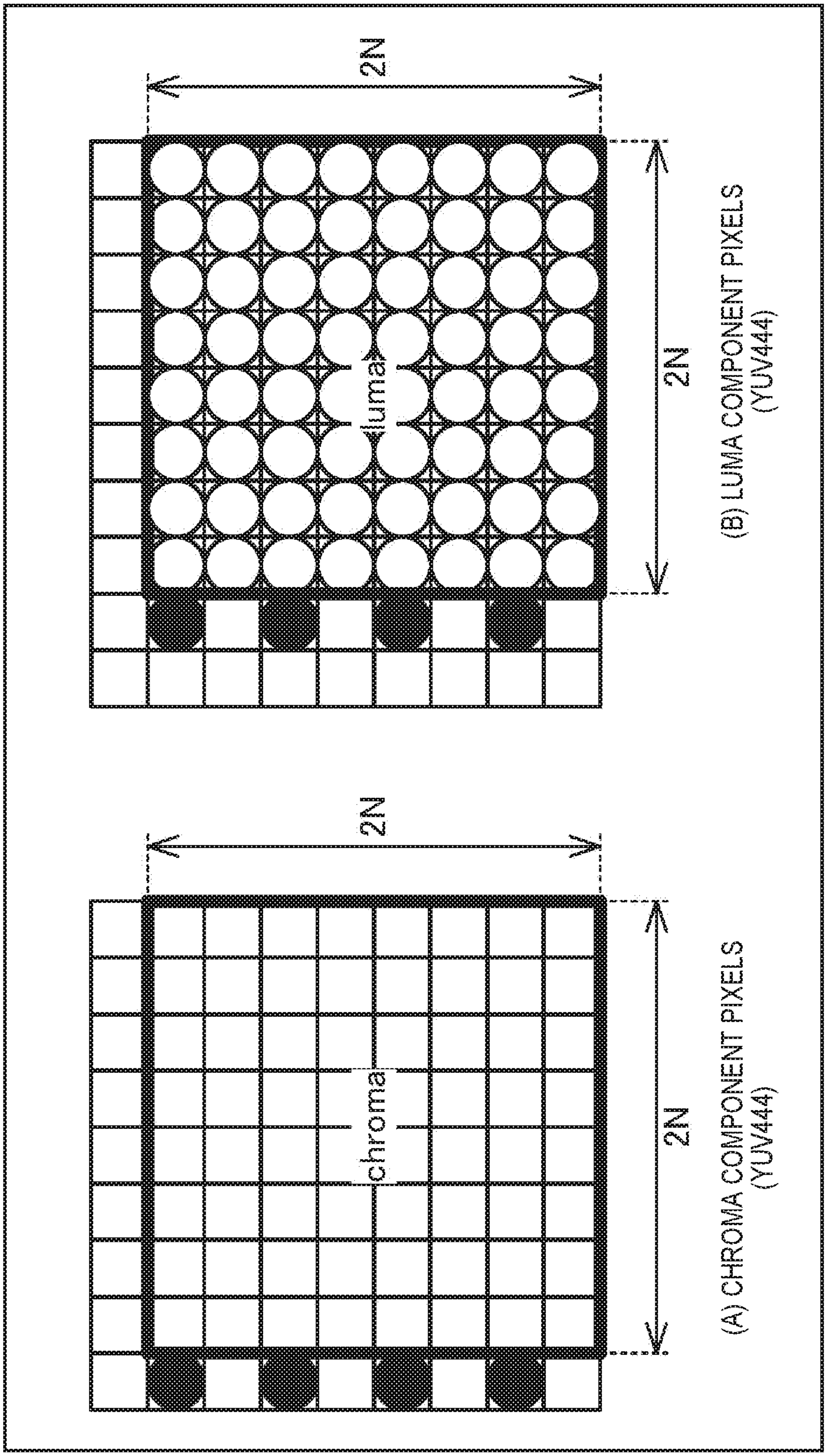
FIG. 13 is a diagram for illustrating operations of intra prediction units provided in a video encoding device and a video decoding device according to a modification of the present invention.

FIG. 13 shows a case of acquiring pixel values of only reference pixels on the left side of the luma block corresponding to the chroma prediction target block, and reference pixels on the left side of the chroma prediction target block. In this example shown in FIG. 13, compared with the first embodiment of the present invention shown in FIG. 7, the pixel value of every other reference pixel on the left side of the luma block and the chroma prediction target block is acquired, and both the number of luma reference pixels and the number of chroma reference pixels are 4 pixels. Accordingly, the number of reference pixels is ¼ of that in the conventional example.

Figure 14:
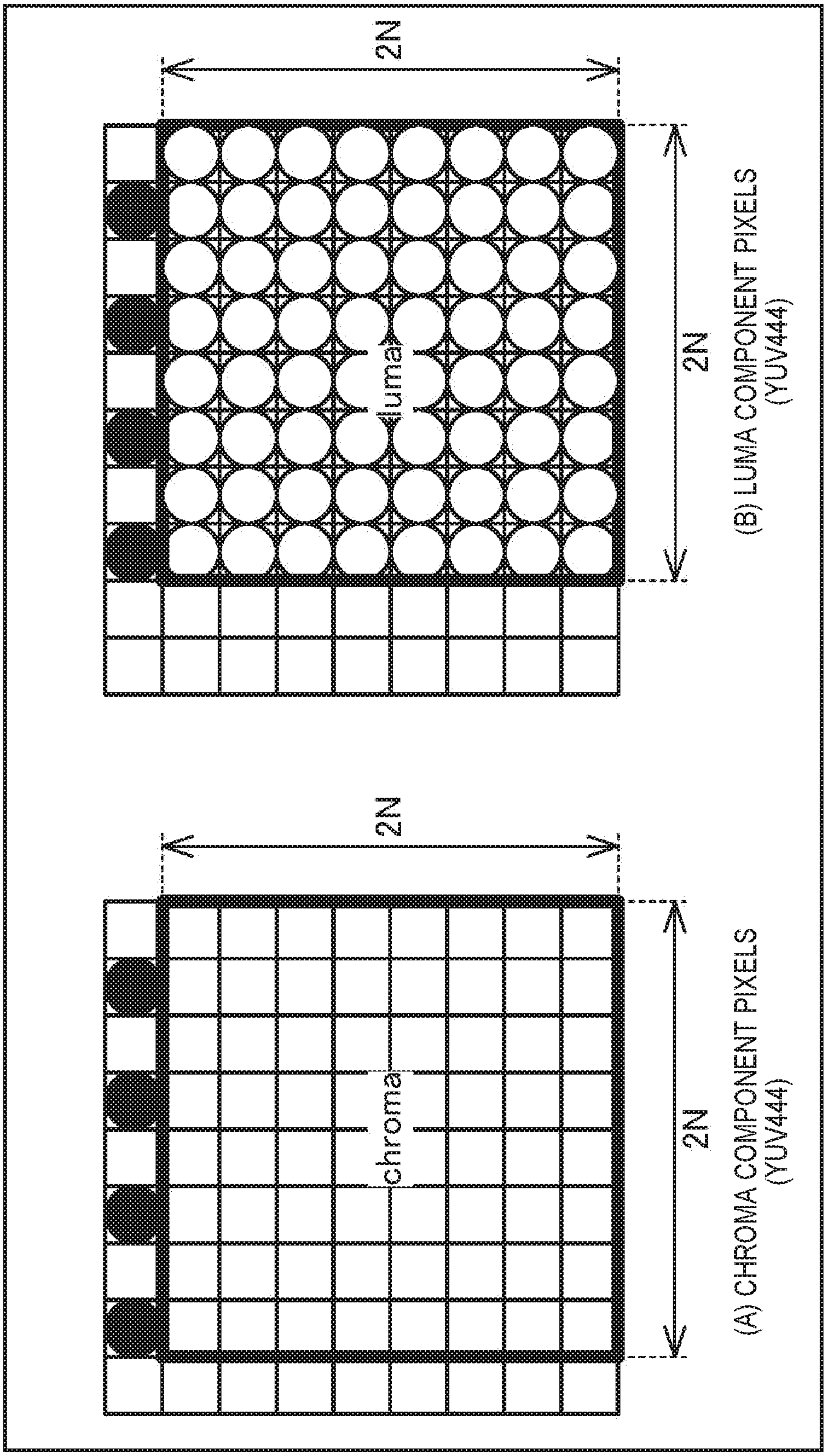
FIG. 14 is a diagram for illustrating operations of intra prediction units provided in a video encoding device and a video decoding device according to a modification of the present invention.

FIG. 14 shows a case of acquiring pixel values of only reference pixels above the luma block corresponding to the chroma prediction target block, and reference pixels above the chroma prediction target block. In this example shown in FIG. 14, compared with the first embodiment of the present invention shown in FIG. 8, the pixel value of every other reference pixel above the luma block and the chroma prediction target block is acquired, and both the number of luma reference pixels and the number of chroma reference pixels are 4 pixels. Accordingly, the number of reference pixels is ¼ of that in the conventional example.

DESCRIPTION OF THE REFERENCE NUMERALS

AA, CC, MM . . . Video encoding device
BB, DD, NN . . . Video decoding device
20, 20A, 20B, 140, 140A, 140B . . . Intra prediction unit
21, 21A, 21B . . . Adaptive-sub-sampling luma reference pixel acquisition unit
22, 22A, 22B . . . Adaptive-sub-sampling chroma reference pixel acquisition unit
23 . . . Prediction coefficient derivation unit
24 . . . Chroma linear prediction unit

What is claimed is:

1. A video encoding device that codes a video image configured to include a plurality of color components, comprising:

an intra-frame prediction unit configured to perform intra-frame prediction, the intra-frame prediction unit including:

an adaptive-sub-sampling luma reference pixel sub-sampling unit configured to sub-sample reference pixels existing neighboring a luma block corresponding to a chroma prediction target block based on a luma intra prediction mode;

an adaptive-sub-sampling luma reference pixel acquisition unit configured to acquire a pixel value of a reference pixel after the sub-sampling performed by the adaptive-sub-sampling luma reference pixel sub-sampling unit;

an adaptive-sub-sampling chroma reference pixel sub-sampling unit configured to sub-sample reference pixels existing neighboring the chroma prediction target block based on the luma intra prediction mode;

an adaptive-sub-sampling chroma reference pixel acquisition unit configured to acquire a pixel value of a reference pixel after the sub-sampling performed by the adaptive-sub-sampling chroma reference pixel sub-sampling unit;

a prediction coefficient derivation unit configured to derive a prediction coefficient using the pixel value acquired by the adaptive-sub-sampling luma reference pixel acquisition unit and the pixel value acquired by the adaptive-sub-sampling chroma reference pixel acquisition unit; and a chroma linear prediction unit configured to linearly predict a predictive pixel value of each pixel constituting the chroma prediction target block, using a local decoded pixel value of the luma block corresponding to the chroma prediction target block and the prediction coefficient derived by the prediction coefficient derivation unit, wherein the adaptive-sub-sampling luma reference pixel sub-sampling unit and the adaptive-sub-sampling chroma reference pixel sub-sampling unit further configured to perform the sub-sampling only in a case where a encoding unit is a predetermined smallest encoding unit.

2. The video encoding device according to claim 1, wherein the adaptive-sub-sampling luma reference pixel sub-sampling unit and the adaptive-sub-sampling chroma reference pixel sub-sampling unit further configured to always perform the sub-sampling regardless of a encoding unit.

3. The video encoding device according to claim 1, wherein the adaptive-sub-sampling luma reference pixel sub-sampling unit and the adaptive-sub-sampling chroma reference pixel sub-sampling unit further configured to perform the sub-sampling and reduce the number of reference pixels to 1/n (where n is any power of two that satisfies n>0) of the number of reference pixels before the sub-sampling.

4. The video encoding device according to claim 1, wherein the video image is a video image of a YUV422 format.

5. The video encoding device according to claim 1, wherein the size of a processing block is 8×8.

6. A video decoding device that decodes a video image configured to include a plurality of color components, comprising:

an intra-frame prediction unit further configured to perform intra-frame prediction, the intra-frame prediction unit including:

an adaptive-sub-sampling luma reference pixel sub-sampling unit configured to sub-sample reference pixels existing neighboring a luma block corresponding to a chroma prediction target block based on a luma intra prediction mode;

an adaptive-sub-sampling luma reference pixel acquisition unit configured to acquire a pixel value of a reference pixel after the sub-sampling performed by the adaptive-sub-sampling luma reference pixel sub-sampling unit;

an adaptive-sub-sampling chroma reference pixel sub-sampling unit configured to sub-sample reference pixels existing neighboring the chroma prediction target block based on the luma intra prediction mode;

an adaptive-sub-sampling chroma reference pixel acquisition unit configured to acquire a pixel value of a reference pixel after the sub-sampling performed by the adaptive-sub-sampling chroma reference pixel sub-sampling unit;

a prediction coefficient derivation unit configured to derive a prediction coefficient using the pixel value acquired by the adaptive-sub-sampling luma reference pixel acquisition unit and the pixel value acquired by the adaptive-sub-sampling chroma reference pixel acquisition unit; and a chroma linear prediction unit configured to linearly predict a predictive pixel value of each pixel constituting the chroma prediction target block, using a local decoded pixel value of the luma block corresponding to the chroma prediction target block and the prediction coefficient derived by the prediction coefficient derivation unit, wherein the adaptive-sub-sampling luma reference pixel sub-sampling unit and the adaptive-sub-sampling chroma reference pixel sub-sampling unit further configured to perform the sub-sampling only in a case where a decoding unit is a predetermined smallest decoding unit.

7. The video decoding device according to claim 6, wherein the adaptive-sub-sampling luma reference pixel sub-sampling unit and the adaptive-sub-sampling chroma reference pixel sub-sampling unit further configured to always perform the sub-sampling regardless of a decoding unit.

8. The video decoding device according to claim 6, wherein the adaptive-sub-sampling luma reference pixel sub-sampling unit and the adaptive-sub-sampling chroma reference pixel sub-sampling unit further configured to perform the sub-sampling and reduce the number of reference pixels to 1/n (where n is any power of two that satisfies n>0) of the number of reference pixels before the sub-sampling.

9. The video decoding device according to claim 6, wherein the video image is a video image of a YUV422 format.

10. The video decoding device according to claim 6, wherein the size of a processing block is 8×8.

11. A video system including a video encoding device that codes a video image configured to include a plurality of color components, and a video decoding device that decodes a video image configured to include a plurality of color components, the video encoding device including an encoding-side intra-frame prediction unit configured to perform intra-frame prediction, the encoding-side intra-frame prediction unit including:

a coding-side adaptive-sub-sampling luma reference pixel sub-sampling unit configured to sub-sample reference pixels existing neighboring a luma block corresponding to a chroma prediction target block based on a luma intra prediction mode;

a coding-side adaptive-sub-sampling luma reference pixel acquisition unit configured to acquire a pixel value of a reference pixel after the sub-sampling performed by the encoding-side adaptive-sub-sampling luma reference pixel sub-sampling unit;

a coding-side adaptive-sub-sampling chroma reference pixel sub-sampling unit configured to sub-sample reference pixels existing neighboring the chroma prediction target block based on the luma intra prediction mode;

a coding-side adaptive-sub-sampling chroma reference pixel acquisition unit configured to acquire a pixel value of a reference pixel after the sub-sampling performed by the encoding-side adaptive-sub-sampling chroma reference pixel sub-sampling unit;

a coding-side prediction coefficient derivation unit configured to derive a prediction coefficient using the pixel value acquired by the encoding-side adaptive-sub-sampling luma reference pixel acquisition unit and the pixel value acquired by the encoding-side adaptive-sub-sampling chroma reference pixel acquisition unit; and a coding-side chroma linear prediction unit configured to linearly predict a predictive pixel value of each pixel constituting the chroma prediction target block, using a local decoded pixel value of the luma block corresponding to the chroma prediction target block, and the prediction coefficient derived by the encoding-side prediction coefficient derivation unit, the video decoding device including a decoding-side intra-frame prediction unit configured to perform intra-frame prediction, the decoding-side intra-frame prediction unit including:

a decoding-side adaptive-sub-sampling luma reference pixel sub-sampling unit configured to sub-sample reference pixels existing neighboring a luma block corresponding to a chroma prediction target block based on the luma intra prediction mode;

a decoding-side adaptive-sub-sampling luma reference pixel acquisition unit configured to acquire a pixel value of a reference pixel after the sub-sampling performed by the decoding-side adaptive-sub-sampling luma reference pixel sub-sampling unit;

a decoding-side adaptive-sub-sampling chroma reference pixel sub-sampling unit configured to sub-sample reference pixels existing neighboring the chroma prediction target block based on the luma intra prediction mode;

a decoding-side adaptive-sub-sampling chroma reference pixel acquisition unit configured to acquire a pixel value of a reference pixel after the sub-sampling performed by the decoding-side adaptive-sub-sampling chroma reference pixel sub-sampling unit;

a decoding-side prediction coefficient derivation unit configured to derive a prediction coefficient using the pixel value acquired by the decoding-side adaptive-sub-sampling luma reference pixel acquisition unit and the pixel value acquired by the decoding-side adaptive-sub-sampling chroma reference pixel acquisition unit; and a decoding-side chroma linear prediction unit configured to linearly predict a predictive pixel value of each pixel constituting the chroma prediction target block, using a local decoded pixel value of the luma block corresponding to the chroma prediction target block and the prediction coefficient derived by the decoding-side prediction coefficient derivation unit, wherein the adaptive-sub-sampling luma reference pixel sub-sampling unit and the adaptive-sub-sampling chroma reference pixel sub-sampling unit further configured to perform the sub-sampling only in a case where a decoding unit is a predetermined smallest decoding unit.

12. A method for encoding a video image in a video encoding device that codes a video image configured to include a plurality of color components, the video encoding device including an intra-frame prediction unit configured to perform intra-frame prediction and having: an adaptive-sub-sampling luma reference pixel sub-sampling unit; an adaptive-sub-sampling luma reference pixel acquisition unit; an adaptive-sub-sampling chroma reference pixel sub-sampling unit; an adaptive-sub-sampling chroma reference pixel acquisition unit; a prediction coefficient derivation unit; and a chroma linear prediction unit, the method comprising:

a first step in which the adaptive-sub-sampling luma reference pixel sub-sampling unit sub-samples reference pixels existing neighboring a luma block corresponding to a chroma prediction target block based on a luma intra prediction mode;

a second step in which the adaptive-sub-sampling luma reference pixel acquisition unit acquires a pixel value of a reference pixel after the sub-sampling performed by the adaptive-sub-sampling luma reference pixel sub-sampling unit;

a third step in which the adaptive-sub-sampling chroma reference pixel sub-sampling unit sub-samples reference pixels existing neighboring the chroma prediction target block based on the luma intra prediction mode;

a fourth step in which the adaptive-sub-sampling chroma reference pixel acquisition unit acquires a pixel value of a reference pixel after the sub-sampling performed by the adaptive-sub-sampling chroma reference pixel sub-sampling unit;

a fifth step in which the prediction coefficient derivation unit derives a prediction coefficient using the pixel value acquired by the adaptive-sub-sampling luma reference pixel acquisition unit and the pixel value acquired by the adaptive-sub-sampling chroma reference pixel acquisition unit; and a sixth step in which the chroma linear prediction unit linearly predicts a predictive pixel value of each pixel constituting the chroma prediction target block, using a local decoded pixel value of the luma block corresponding to the chroma prediction target block and the prediction coefficient derived by the prediction coefficient derivation unit, wherein the adaptive-sub-sampling luma reference pixel sub-sampling unit and the adaptive-sub-sampling chroma reference pixel sub-sampling unit perform the sub-sampling only in a case where a encoding unit is a predetermined smallest encoding unit.

13. A method for decoding a video image in a video decoding device that decodes a video image configured to include a plurality of color components, the video decoding device including an intra-frame prediction unit for performing intra-frame prediction and having: an adaptive-sub-sampling luma reference pixel sub-sampling unit; an adaptive-sub-sampling luma reference pixel acquisition unit; an adaptive-sub-sampling chroma reference pixel sub-sampling unit; an adaptive-sub-sampling chroma reference pixel acquisition unit; a prediction coefficient derivation unit; and a chroma linear prediction unit, the method comprising:

a first step in which the adaptive-sub-sampling luma reference pixel sub-sampling unit sub-samples reference pixels existing neighboring a luma block corresponding to a chroma prediction target block based on a luma intra prediction mode;

a second step in which the adaptive-sub-sampling luma reference pixel acquisition unit acquires a pixel value of a reference pixel after the sub-sampling performed by the adaptive-sub-sampling luma reference pixel sub-sampling unit;

a third step in which the adaptive-sub-sampling chroma reference pixel sub-sampling unit sub-samples reference pixels existing neighboring the chroma prediction target block based on the luma intra prediction mode;

a fourth step in which the adaptive-sub-sampling chroma reference pixel acquisition unit acquires a pixel value of a reference pixel after the sub-sampling performed by the adaptive-sub-sampling chroma reference pixel sub-sampling unit;

a fifth step in which the prediction coefficient derivation unit derives a prediction coefficient using the pixel value acquired by the adaptive-sub-sampling luma reference pixel acquisition unit and the pixel value acquired by the adaptive-sub-sampling chroma reference pixel acquisition unit; and a sixth step in which the chroma linear prediction unit linearly predicts a predictive pixel value of each pixel constituting the chroma prediction target block, using a local decoded pixel value of the luma block corresponding to the chroma prediction target block and the prediction coefficient derived by the prediction coefficient derivation unit, wherein the adaptive-sub-sampling luma reference pixel sub-sampling unit and the adaptive-sub-sampling chroma reference pixel sub-sampling unit perform the sub-sampling only in a case where a decoding unit is a predetermined smallest decoding unit.

14. A non-transitory computer readable storage medium storing a program for causing a computer to execute a method for encoding a video image in a video encoding device that codes a video image configured to include a plurality of color components, the video encoding device including an intra-frame prediction unit configured to perform intra-frame prediction and having: an adaptive-sub-sampling luma reference pixel sub-sampling unit; an adaptive-sub-sampling luma reference pixel acquisition unit; an adaptive-sub-sampling chroma reference pixel sub-sampling unit; an adaptive-sub-sampling chroma reference pixel acquisition unit; a prediction coefficient derivation unit; and a chroma linear prediction unit, the method comprising:

a first step in which the adaptive-sub-sampling luma reference pixel sub-sampling unit sub-samples reference pixels existing neighboring a luma block corresponding to a chroma prediction target block based on a luma intra prediction mode;

a second step in which the adaptive-sub-sampling luma reference pixel acquisition unit acquires a pixel value of a reference pixel after the sub-sampling performed by the adaptive-sub-sampling luma reference pixel sub-sampling unit;

a third step in which the adaptive-sub-sampling chroma reference pixel sub-sampling unit sub-samples reference pixels existing neighboring the chroma prediction target block based on the luma intra prediction mode;

a fourth step in which the adaptive-sub-sampling chroma reference pixel acquisition unit acquires a pixel value of a reference pixel after the sub-sampling performed by the adaptive-sub-sampling chroma reference pixel sub-sampling unit;

a fifth step in which the prediction coefficient derivation unit derives a prediction coefficient using the pixel value acquired by the adaptive-sub-sampling luma reference pixel acquisition unit and the pixel value acquired by the adaptive-sub-sampling chroma reference pixel acquisition unit; and a sixth step in which the chroma linear prediction unit linearly predicts a predictive pixel value of each pixel constituting the chroma prediction target block, using a local decoded pixel value of the luma block corresponding to the chroma prediction target block and the prediction coefficient derived by the prediction coefficient derivation unit, wherein the adaptive-sub-sampling luma reference pixel sub-sampling unit and the adaptive-sub-sampling chroma reference pixel sub-sampling unit perform the sub-sampling only in a case where a encoding unit is a predetermined smallest encoding unit.

15. A non-transitory computer readable storage medium storing a program for causing a computer to execute a method for decoding a video image in a video decoding device that decodes a video image configured to include a plurality of color components, the video decoding device including an intra-frame prediction unit configured to perform intra-frame prediction and having: an adaptive-sub-sampling luma reference pixel sub-sampling unit; an adaptive-sub-sampling luma reference pixel acquisition unit; an adaptive-sub-sampling chroma reference pixel sub-sampling unit; an adaptive-sub-sampling chroma reference pixel acquisition unit; a prediction coefficient derivation unit; and a chroma linear prediction unit, the method comprising:

a first step in which the adaptive-sub-sampling luma reference pixel sub-sampling unit sub-samples reference pixels existing neighboring a luma block corresponding to a chroma prediction target block based on a luma intra prediction mode;

a second step in which the adaptive-sub-sampling luma reference pixel acquisition unit acquires a pixel value of a reference pixel after the sub-sampling performed by the adaptive-sub-sampling luma reference pixel sub-sampling unit;

a third step in which the adaptive-sub-sampling chroma reference pixel sub-sampling unit sub-samples reference pixels existing neighboring the chroma prediction target block based on the luma intra prediction mode;

a fourth step in which the adaptive-sub-sampling chroma reference pixel acquisition unit acquires a pixel value of a reference pixel after the sub-sampling performed by the adaptive-sub-sampling chroma reference pixel sub-sampling unit;

a fifth step in which the prediction coefficient derivation unit derives a prediction coefficient using the pixel value acquired by the adaptive-sub-sampling luma reference pixel acquisition unit and the pixel value acquired by the adaptive-sub-sampling chroma reference pixel acquisition unit; and a sixth step in which the chroma linear prediction unit linearly predicts a predictive pixel value of each pixel constituting the chroma prediction target block, using a local decoded pixel value of the luma block corresponding to the chroma prediction target block and the prediction coefficient derived by the prediction coefficient derivation unit, wherein the adaptive-sub-sampling luma reference pixel sub-sampling unit and the adaptive-sub-sampling chroma reference pixel sub-sampling unit perform the sub-sampling only in a case where a decoding unit is a predetermined smallest decoding unit.

* * * * *